April 22, 1958 W. M. McMILLAN ET AL 2,832,063

SYSTEM FOR RECORDING PUNCHED CARD DATA ON MAGNETIC TAPE

Filed Dec. 31, 1953 18 Sheets-Sheet 1

INVENTORS
WILMUR M. McMILLAN
EDWARD S. WILSON
BY P. E. Henninger
ATTORNEY

INVENTORS
WILMUR M. McMILLAN
EDWARD S. WILSON
BY
P. E. Henninger
ATTORNEY

INVENTORS
WILMUR M. McMILLAN
EDWARD S. WILSON
BY
ATTORNEY

INVENTORS
WILMUR M. McMILLAN
EDWARD S. WILSON
BY P. E. Henninger
ATTORNEY

INVENTORS
WILMUR M. McMILLAN
EDWARD S. WILSON
BY P. E. Henninger
ATTORNEY

SYSTEM FOR RECORDING PUNCHED CARD DATA ON MAGNETIC TAPE

Filed Dec. 31, 1953 18 Sheets-Sheet 6

INVENTORS
WILMUR M. McMILLAN
EDWARD S. WILSON
BY
P. E. Henninger
ATTORNEY

April 22, 1958 W. M. McMILLAN ET AL 2,832,063

SYSTEM FOR RECORDING PUNCHED CARD DATA ON MAGNETIC TAPE

Filed Dec. 31, 1953 18 Sheets-Sheet 7

| | C BA 8421 | | C BA 8421 | | C BA 8421 | | C BA 8421 | | |
|---|---|---|---|---|---|---|---|---|---|
| | 1 11 0000 | | 0 10 0000 | | 0 01 0000 | ǂ | 1 00 0000 | b | 1 |
| | 0 11 0001 | | 1 10 0001 | | 1 01 0001 | | 0 00 0001 | | 2 |
| 11 | 0 11 0010 | - | 1 10 0010 | | 1 01 0010 | | 0 00 0010 | | 3 |
| X-0 | 1 11 0011 | & | 0 10 0011 | - | 0 01 0011 | + | 1 00 0011 | 0 | 4 |
| 1 | 0 11 0100 | A | 1 10 0100 | J | 1 01 0100 | / | 0 00 0100 | 1 | 5 |
| 2 | 1 11 0101 | B | 0 10 0101 | K | 0 01 0101 | S | 1 00 0101 | 2 | 6 |
| 3 | 1 11 0110 | C | 0 10 0110 | L | 0 01 0110 | T | 1 00 0110 | 3 | 7 |
| 4 | 0 11 0111 | D | 1 0 0111 | M | 1 01 0111 | U | 0 00 0111 | 4 | 8 |
| 5 | 0 11 1000 | E | 1 10 1000 | N | 1 01 1000 | V | 0 00 1000 | 5 | 9 |
| 6 | 1 11 1001 | F | 0 10 1001 | O | 0 01 1001 | W | 1 00 1001 | 6 | 10 |
| 7 | 1 11 1010 | G | 0 10 1010 | P | 0 01 1010 | X | 1 00 1010 | 7 | 1 |
| 8 | 0 11 1011 | H | 1 10 1011 | Q | 1 01 1011 | Y | 0 00 1011 | 8 | 2 |
| 9 | 1 11 1100 | I | 0 10 1100 | R | 0 01 1100 | Z | 1 00 1100 | 9 | 3 |
| 8-3 | 0 11 1101 | . | 1 10 1101 | $ | 1 01 1101 | , | 0 00 1101 | | 4 |
| 8-4 | 0 11 1110 | ¤ | 1 10 1110 | * | 1 01 1110 | % | 0 00 1110 | | 5 |
| | 1 11 1111 | | 0 10 1111 | | 0 01 1111 | | 1 00 1111 | | 6 |

FIG. 8

INVENTORS
WILMUR M. McMILLAN
EDWARD S. WILSON
BY P. C. Henninger
ATTORNEY

SYSTEM FOR RECORDING PUNCHED CARD DATA ON MAGNETIC TAPE

Filed Dec. 31, 1953 18 Sheets-Sheet 8

INVENTORS
WILMUR M. McMILLAN
EDWARD S. WILSON
BY P. E. Henninger
ATTORNEY

INVENTORS.
WILMUR M. McMILLAN
EDWARD S. WILSON
BY P. E. Henninger
ATTORNEY

INVENTORS.
WILMUR M. McMILLAN
EDWARD S. WILSON
BY P. E. Henninger
ATTORNEY

INVENTORS.
WILMUR M. McMILLAN
EDWARD S. WILSON
BY
P. E. Henninger
ATTORNEY

INVENTORS.
WILMUR M. McMILLAN
EDWARD S. WILSON
BY P. E. Henninger
ATTORNEY

April 22, 1958 W. M. McMILLAN ET AL 2,832,063

SYSTEM FOR RECORDING PUNCHED CARD DATA ON MAGNETIC TAPE

Filed Dec. 31, 1953 18 Sheets-Sheet 13

INVENTORS.
WILMUR M. McMILLAN
EDWARD S. WILSON
BY P. E. Henninger
ATTORNEY

INVENTORS
WILMUR M. McMILLAN
BY EDWARD S. WILSON
P. E. Henninger
ATTORNEY

SYSTEM FOR RECORDING PUNCHED CARD DATA ON MAGNETIC TAPE

Filed Dec. 31, 1953 18 Sheets-Sheet 15

INVENTORS
WILMUR M. Mc MILLAN
EDWARD S. WILSON
BY
P. E. Henninger
ATTORNEY

INVENTORS
WILMUR M. McMILLAN
EDWARD S. WILSON
BY P. E. Henninger
ATTORNEY

SYSTEM FOR RECORDING PUNCHED CARD DATA ON MAGNETIC TAPE

Filed Dec. 31, 1953 18 Sheets-Sheet 17

INVENTORS
WILMUR M. McMILLAN
EDWARD S. WILSON
BY
P. E. Henninger
ATTORNEY

SYSTEM FOR RECORDING PUNCHED CARD DATA ON MAGNETIC TAPE

INVENTORS
WILMUR M. McMILLAN
EDWARD S. WILSON
BY P. E. Henninger
ATTORNEY

United States Patent Office 2,832,063

Patented Apr. 22, 1958

2,832,063

SYSTEM FOR RECORDING PUNCHED CARD DATA ON MAGNETIC TAPE

Wilmur M. McMillan, Wappingers Falls, and Edward S. Wilson, Poughkeepsie, N. Y., assignors to International Business Machines Corporation, New York, N. Y., a corporation of New York

Application December 31, 1953, Serial No. 401,464

10 Claims. (Cl. 340—174)

This invention relates to a component for electronic data processing apparatus and more particularly to an electronic component for translating and transferring intelligence contained in a given code system on punched cards into another code system on a magnetic tape.

In the handling of masses of data, it is often convenient and desirable to be able to select, store and transfer data contained, for example, on a multiplicity of individually punched cards into a unitary compact storage medium such as a magnetic tape. Transferring such data from a series of cards to a tape, however, necessitates a code translation from the code utilized in the punched cards to a code suitable for use on a magnetic tape. The transferral and translation of such coded data also introduces problems in synchronization of the intelligence contained on successively sensed card portions or columns with the corresponding intelligence to be recorded on the tape. This latter synchronization problem offers increased difficulties in high speed machine operation, which type of operation is, of course, desirable in and of itself.

The invention herein disclosed may be briefly described as a card-to-tape electronic data processing apparatus adapted for inclusion as a component in a larger data processing apparatus and including means for sensing the intelligence contained on punched cards in a given code system, means for translating the sensed intelligence into another code system suitable for storage in a magnetic tape, means for preparing a magnetic tape in accordance with the translated and transferred intelligence, and associated timing control means responsive to the passage of the sensed cards through the sensing means to correlate and control the recordation of the coded intelligence on the tape with the sensed intelligence on the coded cards.

The primary object of this invention is the provision of an improved data translation and transfer component for electronic data processing apparatus.

Another object of this invention is the provision of improved electronic apparatus for translating and transferring intelligence recorded in a given code system on punched cards to a magnetic tape in a different code system.

A further object of this invention is the provision of an improved timing control system for punch card sensing apparatus and more specifically to provide a card synchronized, self-timing control system for high speed machine operation.

Other objects and advantages of the invention will be pointed out in the following specification and claims and will be illustrated in the accompanying drawings which disclose, by way of example, the principles of the invention and the presently preferred embodiments incorporating those principles.

Referring to the drawings:

Fig. 1 is a schematic block diagram of the data processing apparatus forming the subject matter of the invention;

Figs. 2, 3, 4 5 and 6 when arranged as indicated in Fig. 7 constitute an overall block diagram of the system comprising the invention;

Fig. 8 is a chart showing the particular code utilized to store the sensed intelligence on the magnetic tape and relates the so-called "Excess-Three" code to the intelligence contained on the cards in the conventional Hollerith code;

Figures 9, 9A, 9B:
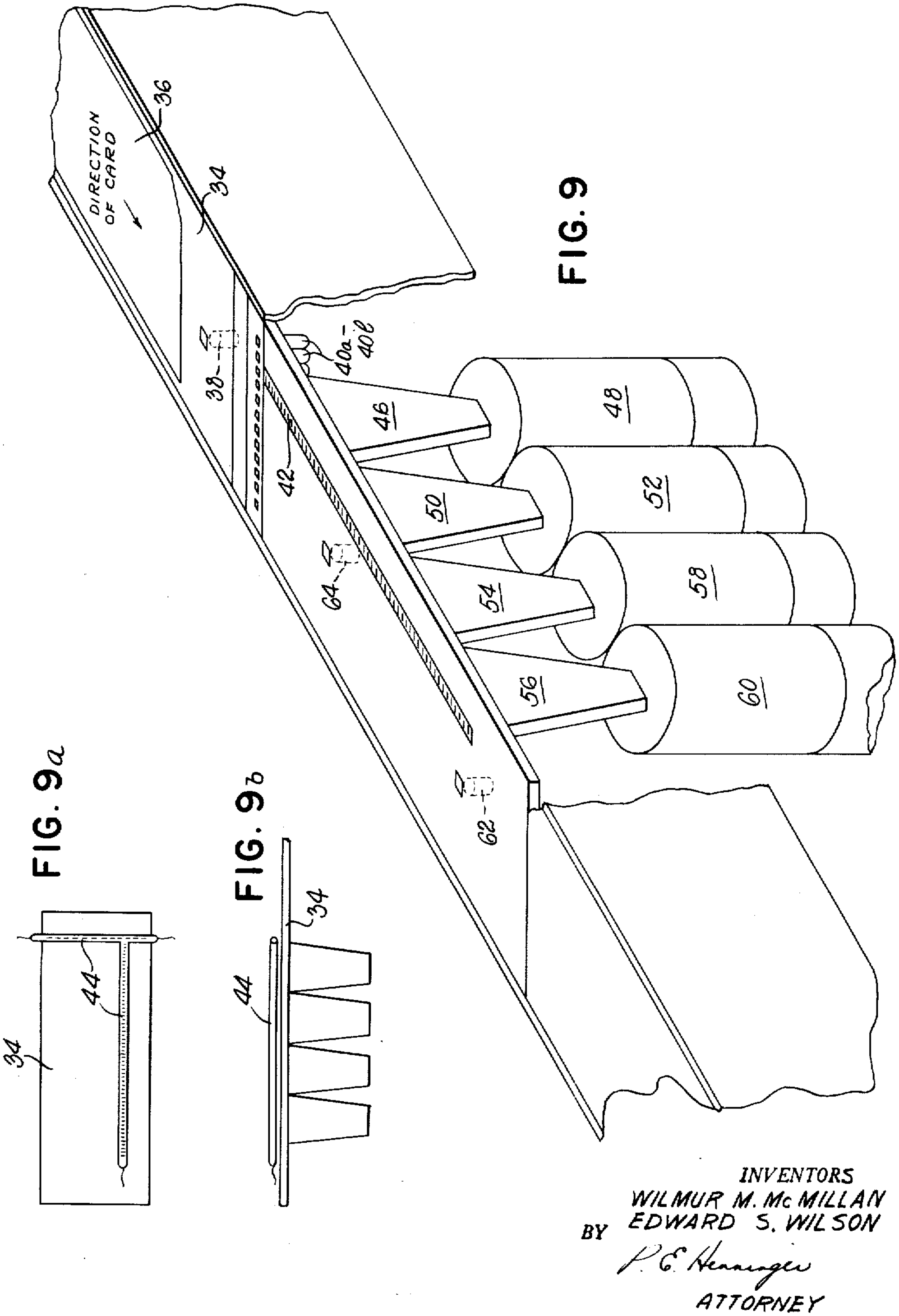
Fig. 9 is an oblique schematic view of the intelligence sensing unit and the card sensing unit.
Figure 10:
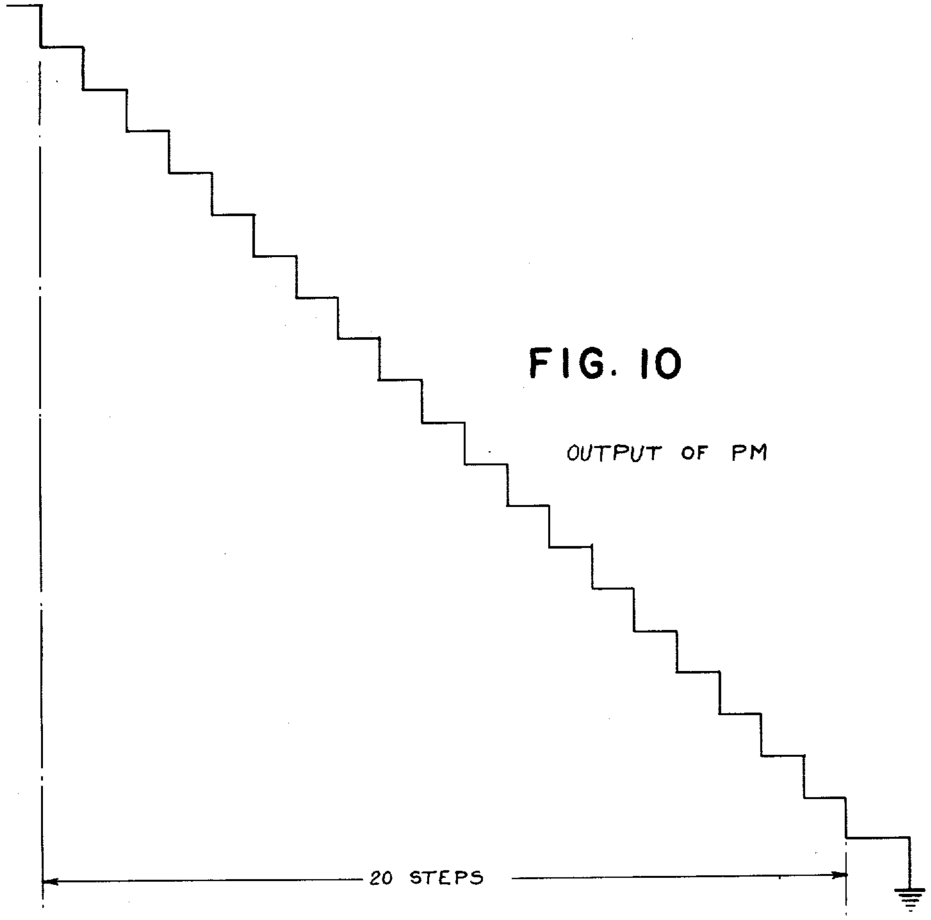
Figure 10:
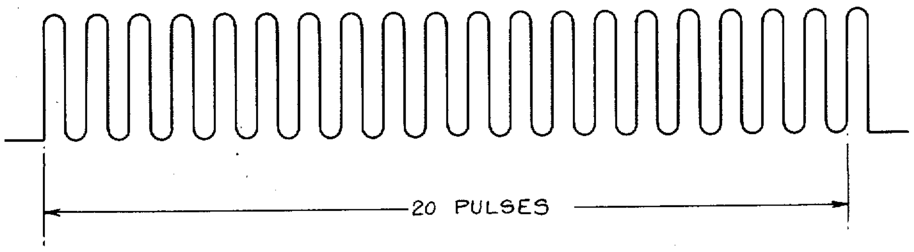
Figures 11, 12, 13:
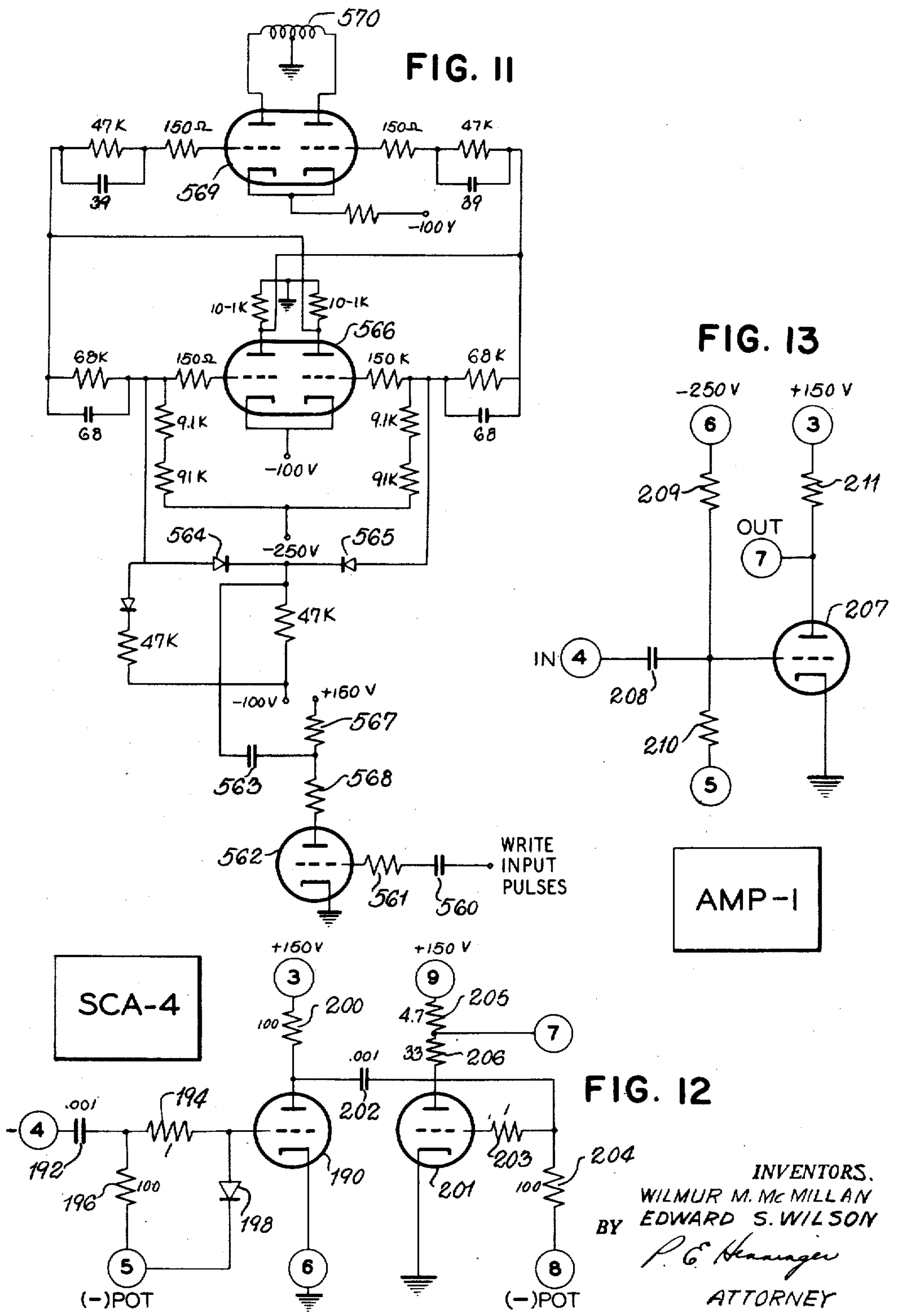
Figure 14:
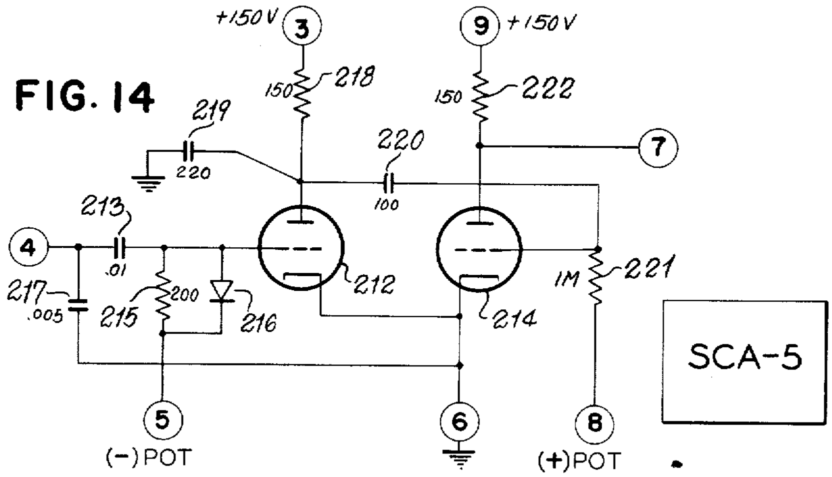
Figure 15:
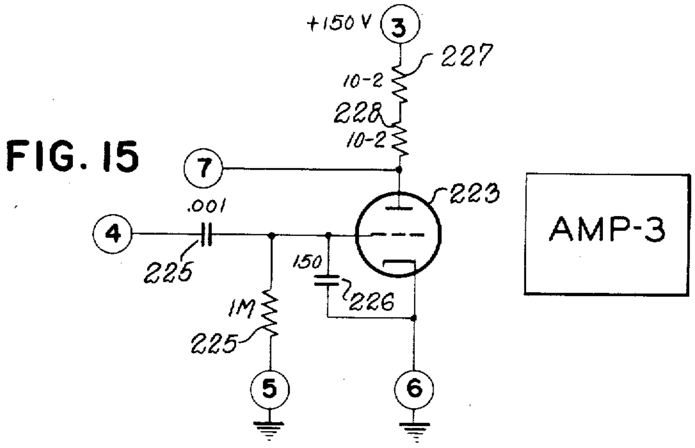
Figure 16:
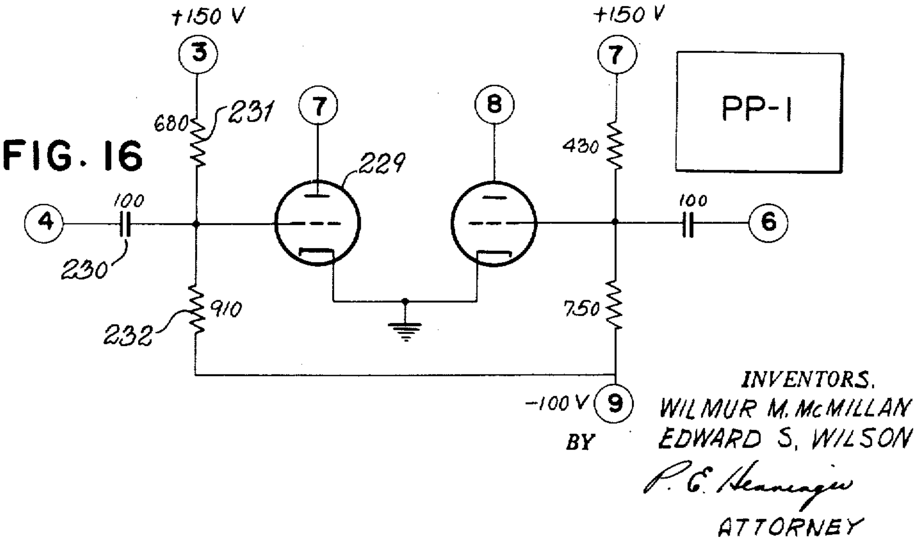
Figures 17, 18, 19:
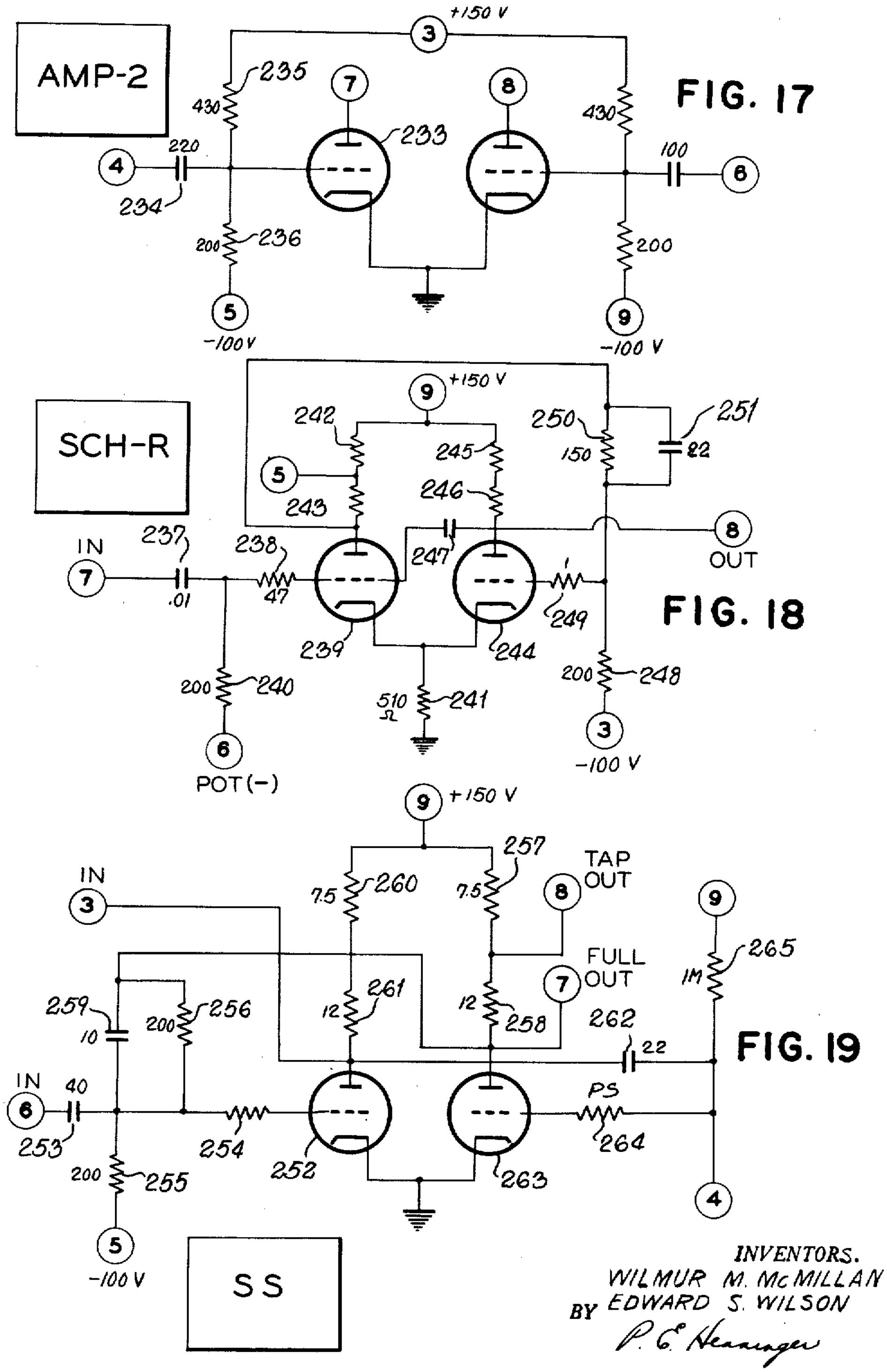
Figures 20, 21:
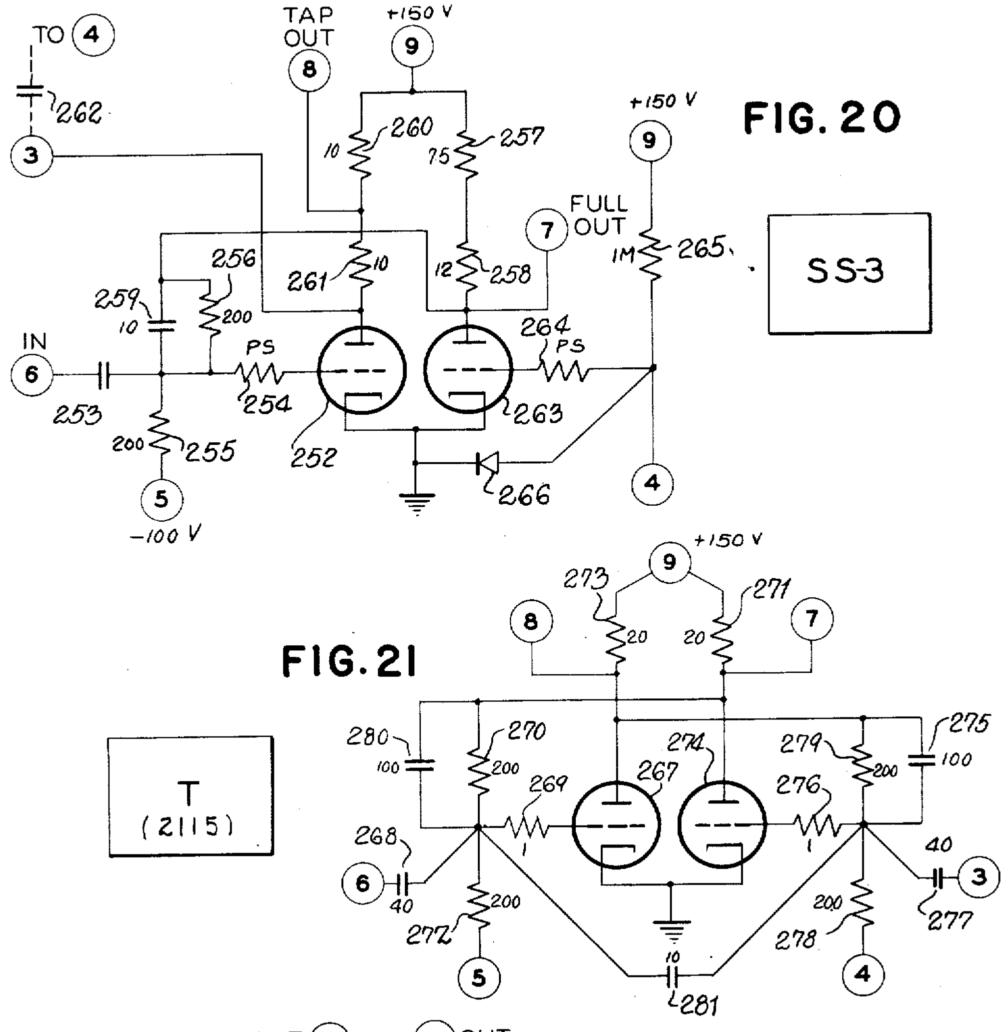
Figure 22:
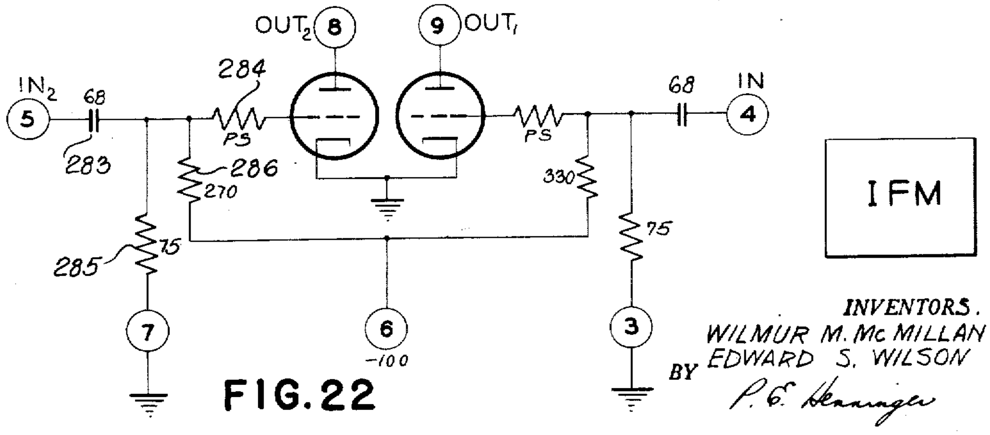
Figure 23:
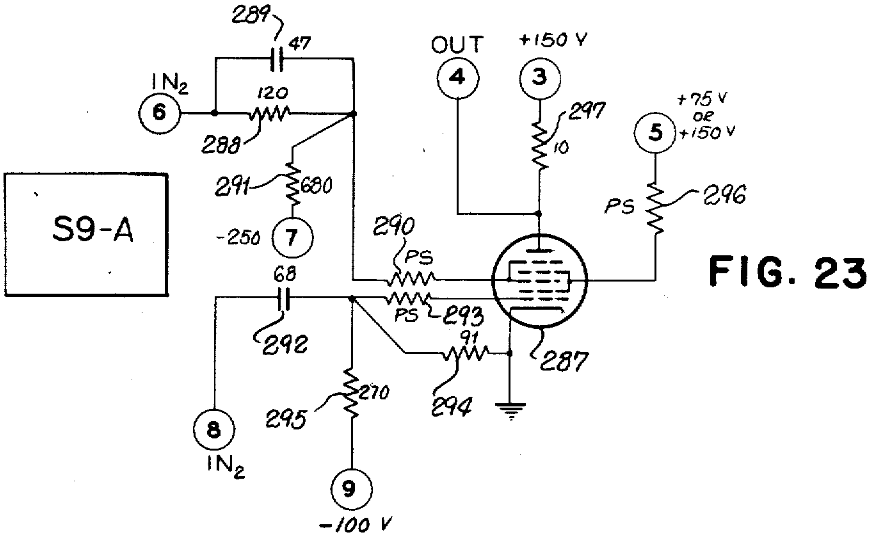
Figure 24:
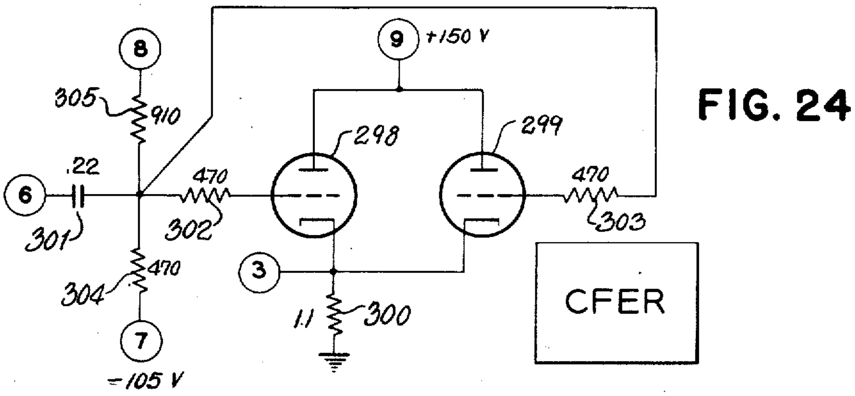
Figure 25:
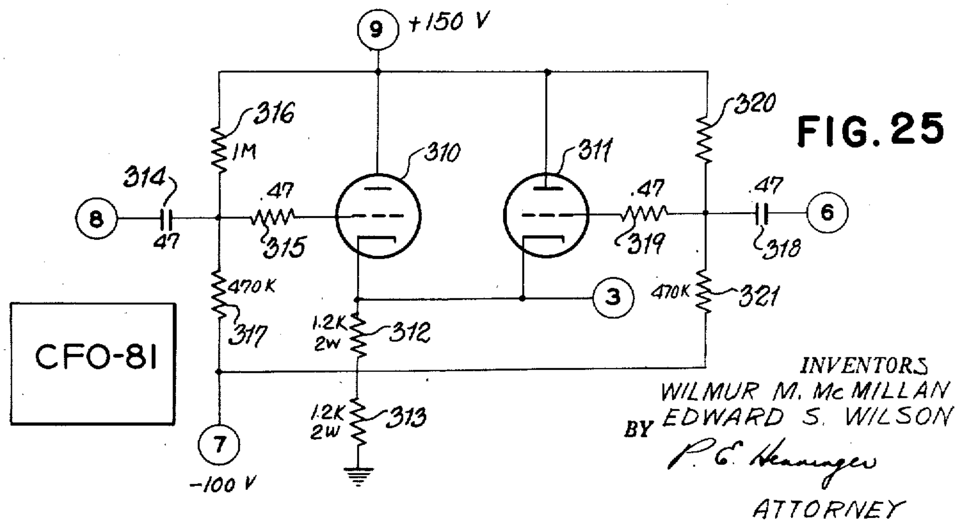
Figure 26:
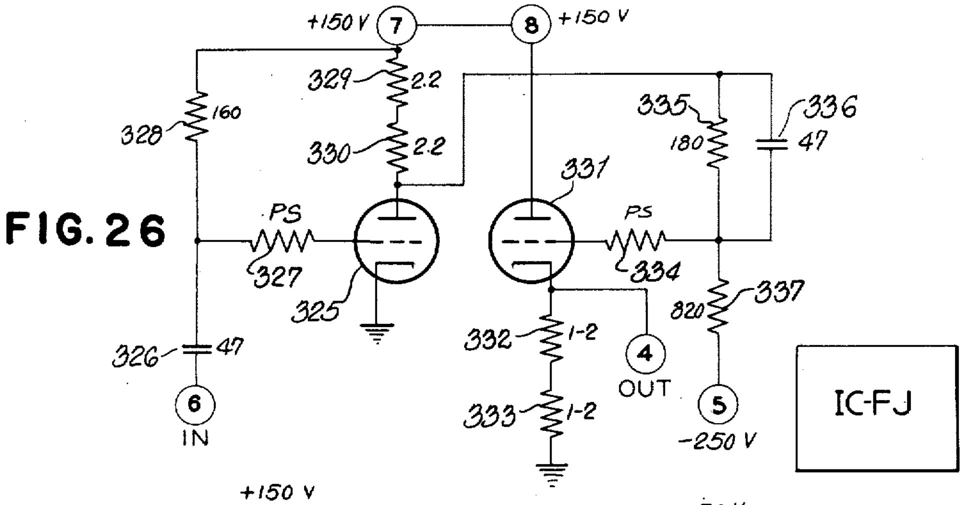
Figure 27:
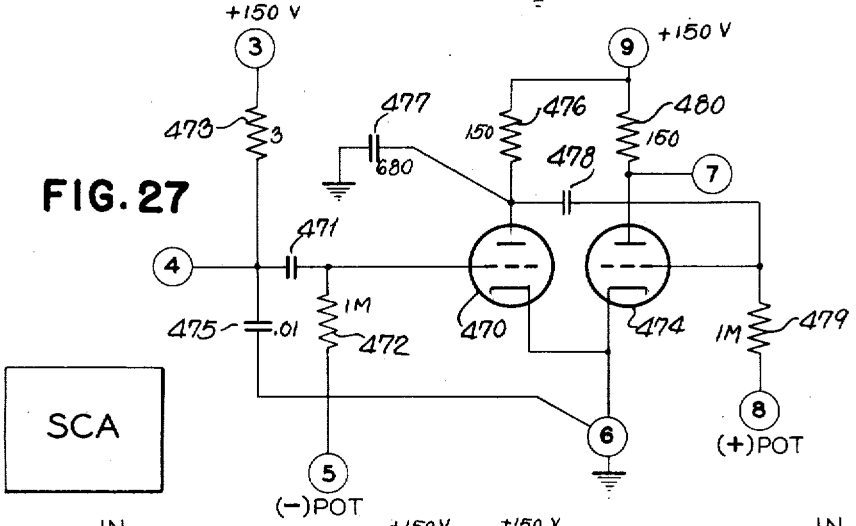
Figure 28:
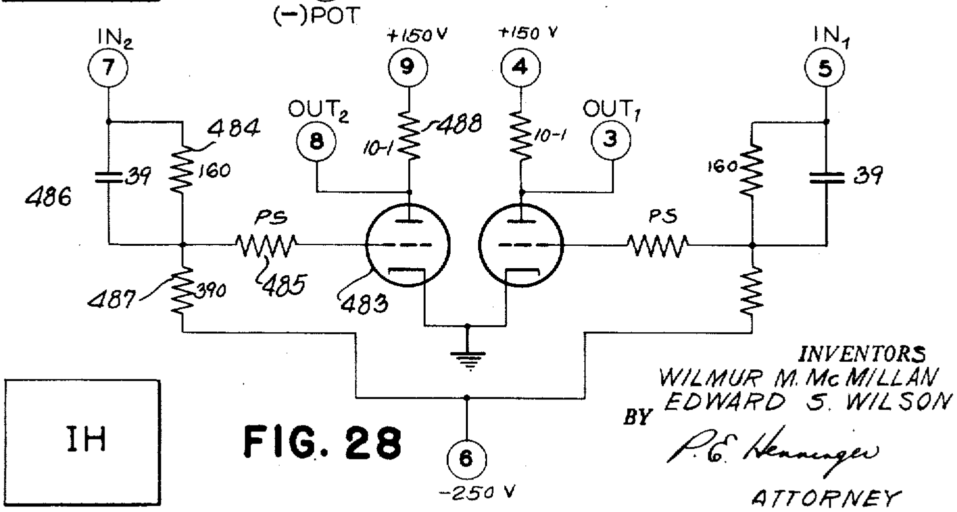
Figure 29:
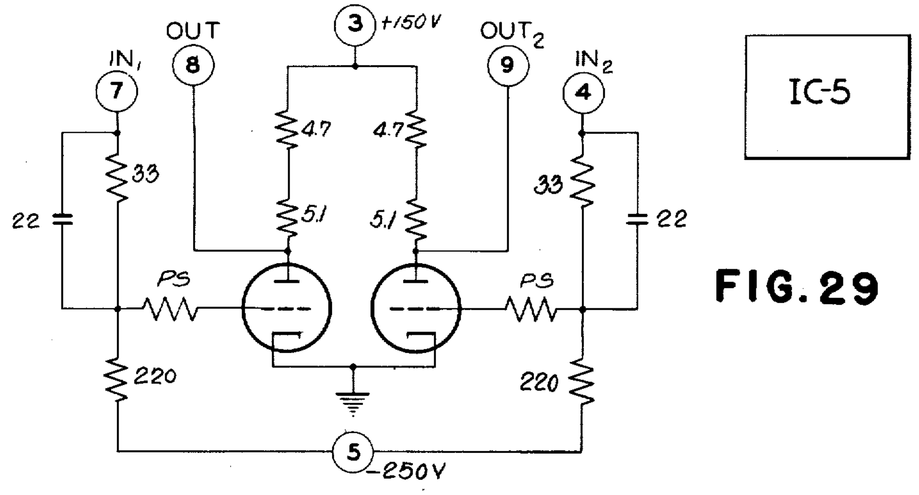
Figures 30, 31:
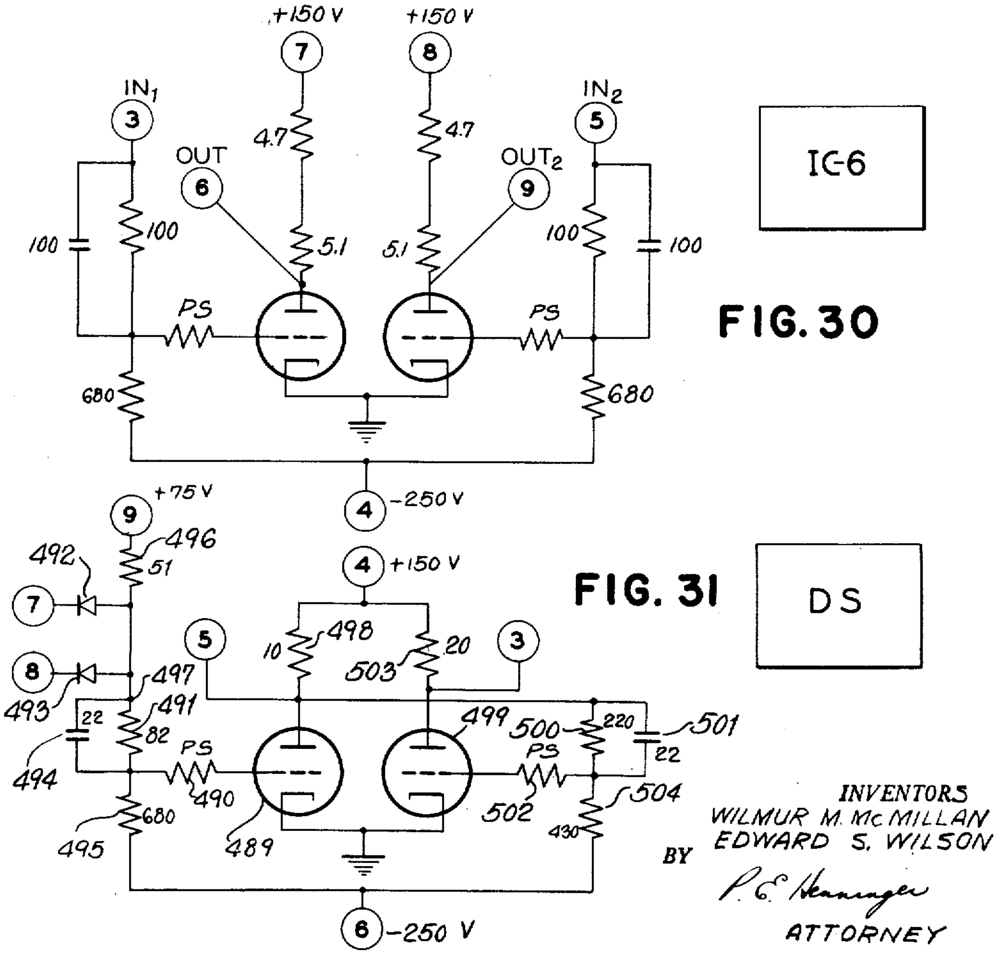
Figures 32, 33:
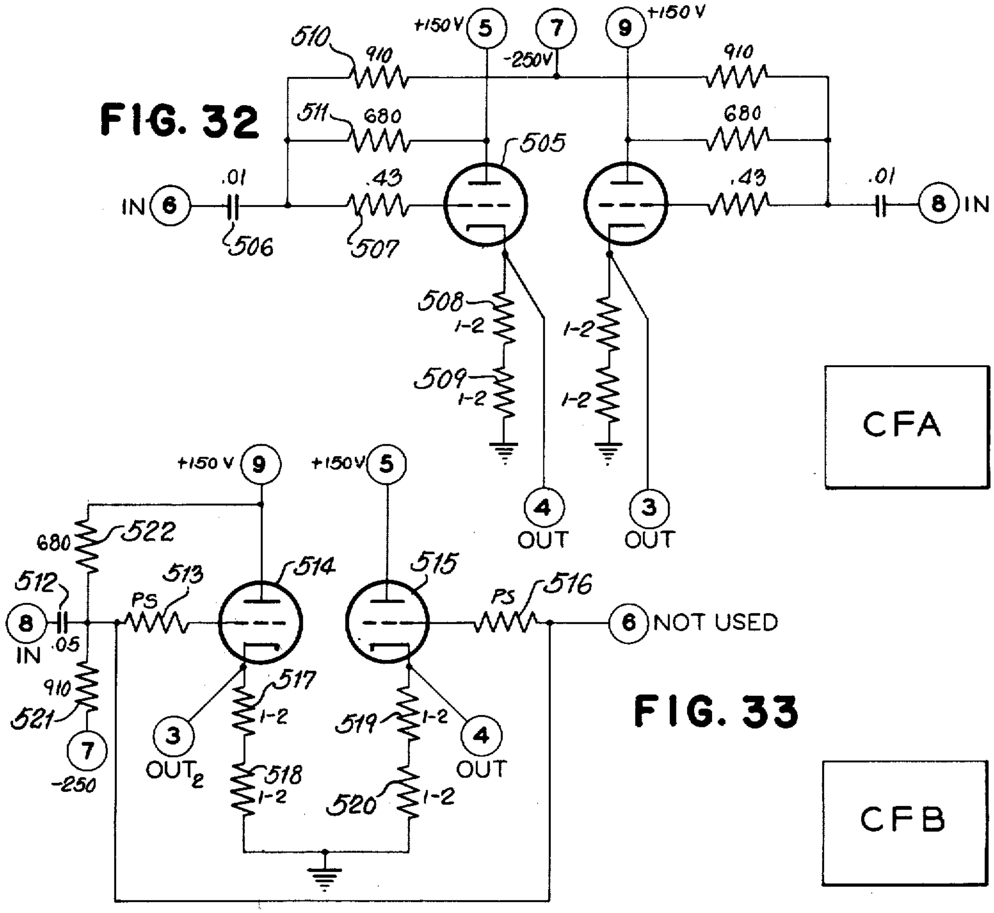
Figure 34:
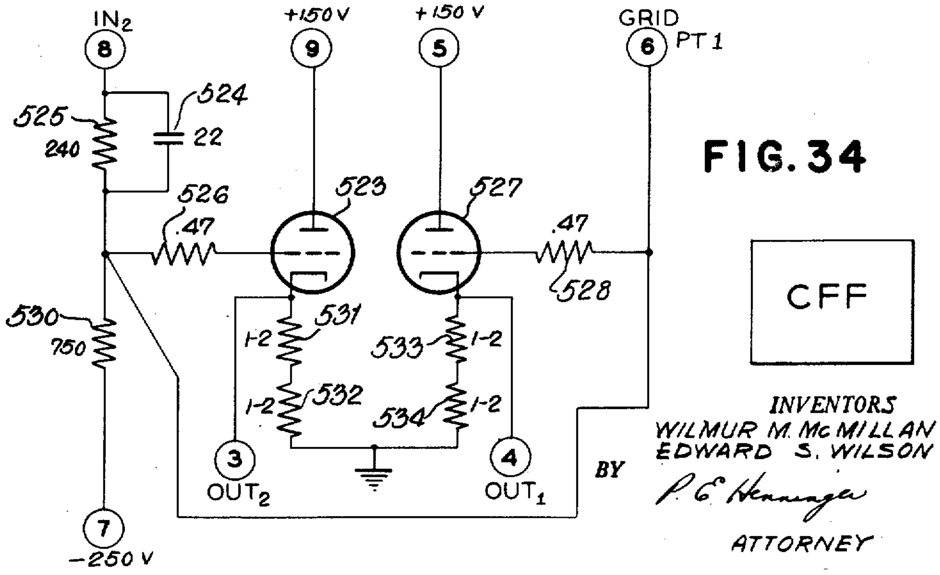
Figure 35:
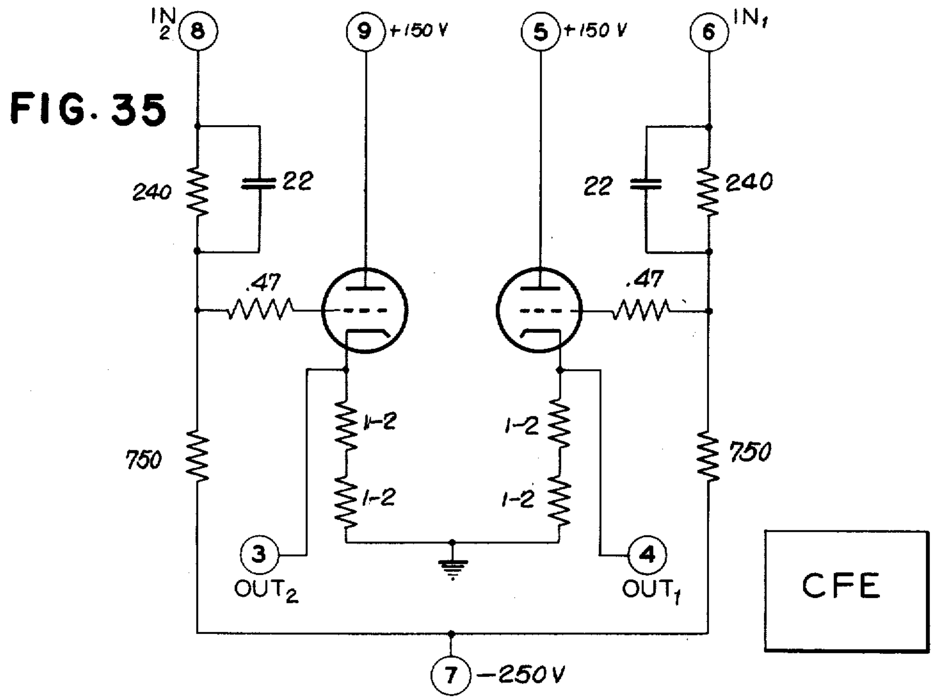
Figure 36:
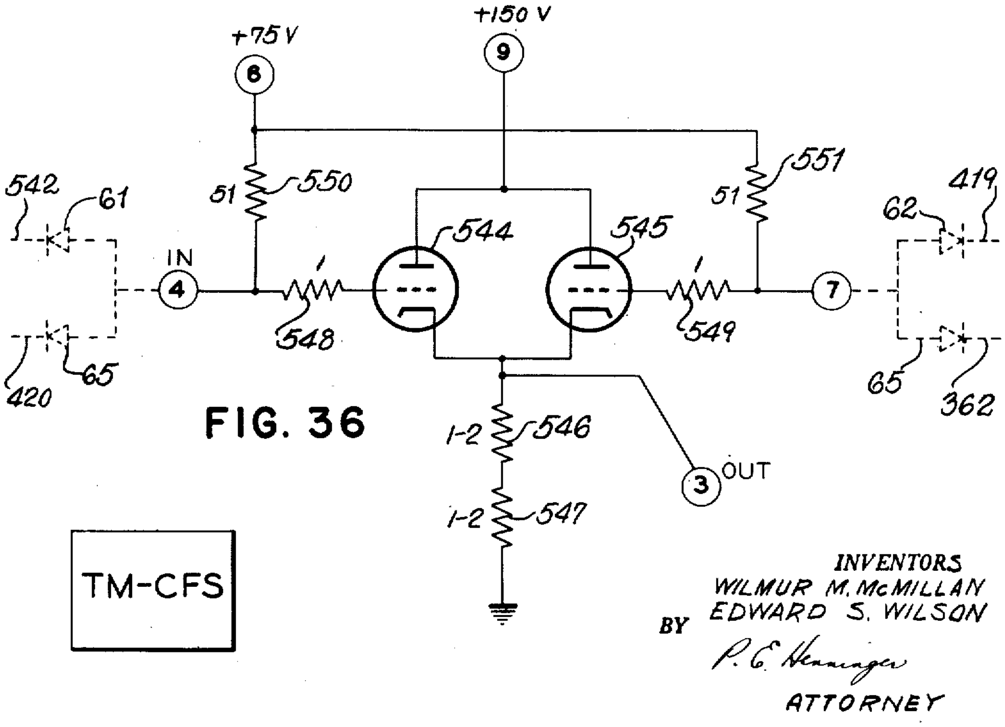

Figs. 9*a* and 9*b* are schematic plan and side elevational views respectively of the light sources for the sensing units illustrated in Fig. 9;

Figs. 10 and 10*a* schematically illustrate the voltage wave forms obtained in the card position sensing unit;

Fig. 11 is a circuit diagram of a magnetic tape writing unit;

Fig. 12 is the block symbol and the detailed circuit diagram of the SCA–4 sensing cell amplifier;

Fig. 13 is the block symbol and the detailed circuit diagram of the AMP–1 amplifier-inverter;

Fig. 14 is the block symbol and the detailed circuit diagram of the SCA–5 amplifier;

Fig. 15 is the block symbol and the detailed circuit diagram of the AMP–3 amplifier-inverter;

Fig. 16 is the block symbol and the detailed circuit diagram of the PP–1 plate pull-over;

Fig. 17 is the block symbol and the detailed circuit diagram of the AMP–2 amplifier and plate pull-over;

Fig. 18 is the block symbol and the detailed circuit diagram of the SCH–R trigger;

Fig. 19 is the block symbol and the detailed circuit diagram of the SS, SS–1 and SS–2 single shot multivibrators;

Fig. 20 is the block symbol and the detailed circuit diagram of the SS–3 single shot multivibrator;

Fig. 21 is the block symbol and the detailed circuit diagram of the 2115 trigger;

Fig. 22 is the block symbol and the detailed circuit diagram of the IFM inverter-plate pull-over;

Fig. 23 is the block symbol and the detailed circuit diagram of the S–9A gate or switch circuit;

Fig. 24 is the block symbol and the detailed circuit diagram of the CFER cathode follower;

Fig. 25 is the block symbol and the detailed circuit diagram of the CFO–81 cathode follower;

Fig. 26 is the block symbol and the detailed circuit diagram of the IC–FJ inverter cathode follower;

Fig. 27 is the block symbol and the detailed circuit diagram of the SCA amplifier;

Fig. 28 is the block symbol and the detailed circuit diagram of the IH inverter;

Fig. 29 is the block symbol and the detailed circuit diagram of the IC–5 inverter;

Fig. 30 is the block symbol and the detailed circuit diagram of the IC–6 inverter;

Fig. 31 is the block symbol and the detailed circuit diagram of the DS diode switch;

Fig. 32 is the block symbol and the detailed circuit diagram of the CFA cathode follower;

Fig. 33 is the block symbol and the detailed circuit diagram of the CFB cathode follower;

Fig. 34 is the block symbol and the detailed circuit diagram of the CFF cathode follower;

Fig. 35 is the block symbol and the detailed circuit diagram of the CFE cathode follower; and Fig. 36 is the block symbol and the detailed circuit diagram of the TM–CFS cathode follower switch.

The card-to-tape unit herein disclosed may be classified as the coded intelligence translation and transformation components of the data processing machine with which they are to be associated, because they have the property of being able to sense coded information from a punched card and to translate and transform said coded data into another code suitable for use on a magnetic tape. The device and the components of the device herein described, although particularly adapted for use as a component element of a larger data processing machine, have distinct and separate utility both as individual units and as a combination and, in addition, have utility in combination with other data processing apparatus.

*Code systems*

The data to be translated and transformed in the functioning of the particular data processing machine component described herein is presented to the machine in the form of selectively positioned punched holes in standard tabulating cards. On such cards, using the conventional Hollerith code, for example, there are provided 81 columns available for intelligence recordation purposes lengthwise of the card and 12 rows transversely of the card comprising 9 digital rows for the digits 1 to 9 inclusive and three zone rows conventionally designated as the 0, 11 and 12 rows.

In conventional usage there are thus available 27 two-punch permutations comprising a zone punch and a digital punch, and as a 26 letter alphabet is used, the 0–1 combination is conventionally omitted. There are thus available 26 two-punch combinations comprising a digital punch and a zonal punch for the alphabet and 9 single digital punches for the digits 1 to 9 inclusive. In addition thereto, digital combination punches, for example 8–3 or 8–4, with any zone punch provides additional coding for special characters.

The punched card data as described above is recorded in six channels of a seven channel magnetic tape with the channels running parallel to the length thereof. A "bit" of information is represented by a magnetized spot on a channel. In a binary system, as in the present case, it is necessary to store only a 1 or a 0. It would seem, therefore, that a plus flux pattern should represent a 1 and that a negative flux pattern should represent a 0. In the present system, however, the information is recorded on the tape by the so-called "non-return to zero" system wherein a change in the pulse pattern denotes a binary 1, and a binary 0 is indicated by the quiescent state of the flux as a function of time. Stated in other words, it is the transition or the state of flux which determines a binary 1. In the formation of a binary 1, the writing circuit makes use of the fundamental fact that there will be a change in the time rate of flux in the writing head whenever a voltage is induced therein. Therefore, a binary 1 is produced by the application of a directional voltage through the writing head, producing the necessary transition in flux, and a binary 0 is produced when there is no change in the flux pattern generated in the writing head in reference to a time scale. The advantages of the "non-return to zero" system are higher intensity of bit packing, a higher output when subsequently read, and easier erasing.

A set of six bits or less recorded in a line perpendicular to the six channels on the magnetic tape will herein be referred to as a group of bits. The 7th channel on the tape serves as a subsequent check on the writing and reading of the bits in the other six channels by the so-called redundancy check principle. That is, either a 0 or a 1 is recorded in the 7th channel so that across the seven channels there is always an odd number of 1's in each set of seven bits. When the tape is subsequently read, the number of 1's can be automatically checked. If the number is even, the operator can then be warned that the number of 1's in the group does not check. If the number of 1's is odd, as it should be in every instance, and when correct, the subsequent reading machine can continue the reading process.

In light of the above, the components herein described are adapted to use the so-called excess-three code for recordation of the sensed intelligence on the magnetic tape. In addition to the 26 letter alphabet, nine digits and the eleven special characters conventionally utilized in the standard Hollerith card code, there must be added to the tape a field mark to separate successive fields thereon. This field may conventionally be designated by a group of 5 columns on the card. It is also necessary to be able to tell the sign of certain coded information on the tape, and for that purpose there is used either a plus or a minus field mark. In addition to the above, it is also necessary to provide some indication on the tape of the end of a particular message contained on a given card. For this purpose, a record mark is included. In actual code transformation, there are available four zone positions. Three of these appear on the punched card, and the fourth being a no-zone condition. The permutations available through this combination permit four separate zones set up by combinations of punches in the A and B or 0 and 11 rows in the card and the utilization of one of the rows—the 12 row, or C channel on the tape—as a redundancy check for the purposes described above.

The coding for the excess-three code for the alphabet, digits and special symbols is set forth in Fig. 8. With reference to that figure, the seven channels on the tape are designated as a "C" channel for redundancy check, "B" and "A" channels which may be conveniently designated as the zone channels, and four digital channels conveniently designated as the "8," "4," "2" and "1" channels. The various permutations of bits for the tape code are readily obtained by a column comparison of the chart on Fig. 8.

*Brief statement of functional operation*

In order that the more detailed description of the nature and operation of the card-to-tape code translating component comprising this invention may be more readily understood, it is believed that a brief statement of its operation, without reference to details may be helpful.

Figure 1:
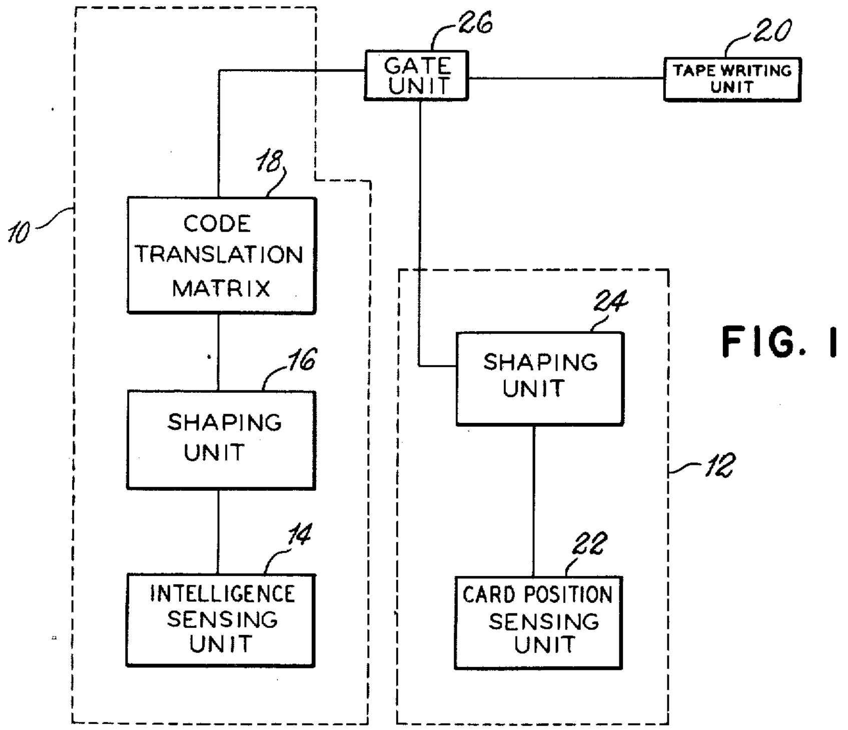
Figure 7:
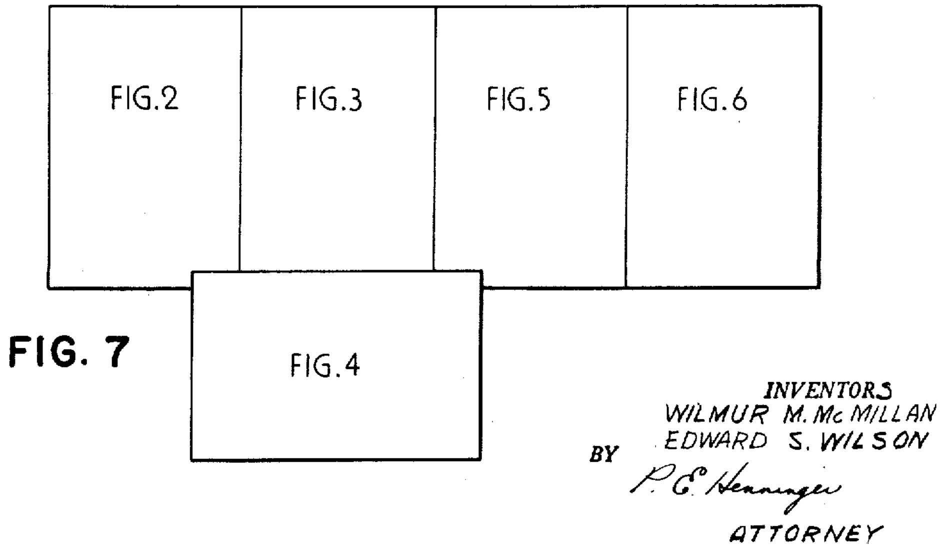
Fig. 7 illustrates the alignment of Figs. 2, 3, 4, 5 and 6 to form a unitary overall block diagram of the system comprising the invention.

As indicated in Fig. 1 of the drawings, the card-to-tape electronic data processing system forming the subject matter of this invention includes generally a coded data translating and transforming component 10, a timing control component 12, and a tape writing unit 20.

The coded data translation and transformation component 10 includes an intelligence sensing unit 14 adapted to simultaneously and electronically sense the 12 rows on a moving punched card, in column-by-column order, and to provide independent successive varying combinations of discrete electrical impulses in accordance with the information contained in the successive individual columns of the card rows. These discrete electrical impulses are then individually suitably amplified and shaped in the shaping unit 16 and are then fed into an electronic code translation matrix 18 for conversion into discrete electrical impulses adapted to selectively energize the magnetic tape writing heads contained in the tape writing unit 20 in accordance with the so-called excess-three code after passage through a gate unit 26.

The timing control component includes a card position sensing unit 22 of a nature that renders self-timing the card being sensed by the intelligence sensing unit 14. The leading edge of the card is utilized to produce a series of successive discrete electrical impulses corresponding in time to the particular columns thereon then being sensed by the inteligence sensing unit 14. These discrete electrical impulses are then individually shaped in a suitable shaping unit 24 and are applied to the gate unit 26 mentioned above.

The gate unit 26 is adapted to pass the translated coded intelligence output of the translation matrix 18 into the tape writing unit 20 only if there is simultaneously applied to it the corresponding timing pulse representative of the column position of the sensed intelligence. It is thus apparent that the sensed card is in reality self-timing.

All of the timing circuits contained within the timing control unit are controlled from the leading edge of the card. If there is any slippage and consequent slowing down of the rate of advance of the card in its passage through the intelligence sensing unit, all of the reading circuits included therein are delayed, as is the leading edge of the card, and the circuits thus remain in time with the card at all times. The same, of course, would be true if the speed of the card should increase in its passage through the sensing unit.

For the purpose of convenience, the following portions of this disclosure will consider the elements making up the components of the disclosed machine on an individual basis. There will first be considered the timing control component 12, then the data translating and transformation component 10 and finally the tape writing unit 20 and various miscellaneous components.

*Timing control component*

The mechanical arrangement of the components of the card position sensing unit 22 and the intelligence sensing unit 14 are shown in Fig. 9. There is provided a longitudinal card track 34 of a width suitable to accommodate a punched card 36 and to prevent undue skewing thereof as it travels in the direction indicated by the arrow thereon. Disposed in the path of card travel is a photocell unit 38, which, when triggered by the advancing card 36, serves to provide an electrical impulse used to control the starting and stopping of the magnetic tape. Spaced from the photocell unit 38 and perpendicularly disposed across the path of card travel is a single column of twelve individual intelligence sensing photocells **40*a* through 40*l*, respectively, suitably located to sense the punched designations in the twelve rows of a standard card. The photocells 40*a* through 40*l* form a part of the intelligence sensing unit 14** (Fig. 1).

Disposed perpendicularly to and spaced a predetermined distance from the line of the intelligence sensing photocells **40*a* through 40*l* is a longitudinally disposed timing track 42. The timing track 42 is formed of 82 separate and narrow light transmitting slots and should, of course, be located in the land space between two successive rows on the card or in the land space between two adjacent intelligence sensing photocells 40*a* through 40*l***, preferably between the "11" and "0" column card position or the corresponding intelligence sensing photocells.

Disposed above the single column of intelligence sensing photocells **40*a* through 40*l*, respectively, and the slotted timing track 42**, as shown in Figs. 9*a* and 9*b*, is a suitable tubular light source 44 preferably having an output in the blue region (4800±500 angstroms) of the spectrum.

Disposed beneath the first 21 slots of the timing track 42, which 21 slots correspond to card column 0 through 20, inclusive, is a focusing prism 46 and a photo-multiplier tube 48. Similarly disposed beneath slots 22 through 41 of the timing track 42, which slots correspond to card columns 21 through 40, is a second focusing prism 50 and a second photomultiplier 52. In a similar manner, the focusing prisms 54 and 56 and the photomultipliers 58 and 60 are disposed beneath the remaining portions of the slotted timing track 42 and correspond to card columns 41 through 60 and 61 through 80, respectively. The last slot of the 82 slot-timing track 42 is provided with a separate card positioning photocell unit 62 disposed therebeneath. Also included in the bed of the card track 34 is a second photocell unit 64 which operates in conjunction with the photocell unit 38 to control the stopping and starting of the magnetic tape.

In operation of the above described unit, the cards are fed lengthwise past the intelligence sensing photocells **40*a* through 40*l*. With no cards in the system, light from the light source 44 is transmitted through the slots in the timing track 42 onto the photomultipliers 48, 52, 58 and 60 located therebeneath, with the prism members 46, 50, 54 and 56, respectively, serving to collect and focus the transmitted light from the respective slot groupings. As a card passes along the track 34 the timing track 42 senses the location of the leading edge of the card relative to each column that is being read in the reading station, i. e. photocell units 40*a* through 40*l*. As the card 36 advances, the leading edge thereof successively and sequentially covers the slots of the timing track 42 and this results in a progressive diminution of the light falling on the photomultipliers 48, 52, 58 and 60, respectively. As the slots in the timing track 42 are discrete in nature, the stages of the progressive diminution of the light transmitted to the photomultipliers are incremental and distinct and can readily be transformed therein into a stepped voltage wave, the individual steps of which correspond to the individual slots in the timing track 42** being covered by the advancing card. The general shape of the stepped voltage wave obtained from across a suitable load resistor in the photomultipliers is shown in Fig. 10.

*Detailed description of timing control circuits*

The general function of the timing control circuit is to provide a series of discrete electrical pulses corresponding to the individually sensed columns on the card and to successively apply this series of discrete electrical pulses to the gate unit 26 (Fig. 1) so as to permit the individual gate circuits to transmit the translated and transformed information obtained from each of the corresponding sensed card columns to the writing heads and hence onto the magnetic tape.

Briefly, this is accomplished by obtaining a stepped voltage out of the photomultiplier units corresponding to the successive and sequential covering of the slots on the timing track 42 by the leading edge of the card in its passage through the unit, differentiating this stepped voltage to provide a series of discrete electrical pulses, and then to use these discrete pulses, after suitable sharpening and shaping to gate the various writing circuits by applying them to the gate unit 26 (Fig. 1). In such manner the discrete pulses are in reality timed by the leading edge of the advancing card and as such result in a self-timed synchronization of the transferral and transformation of the coded information contained in the various card columns onto the magnetic tape.

Figure 6:
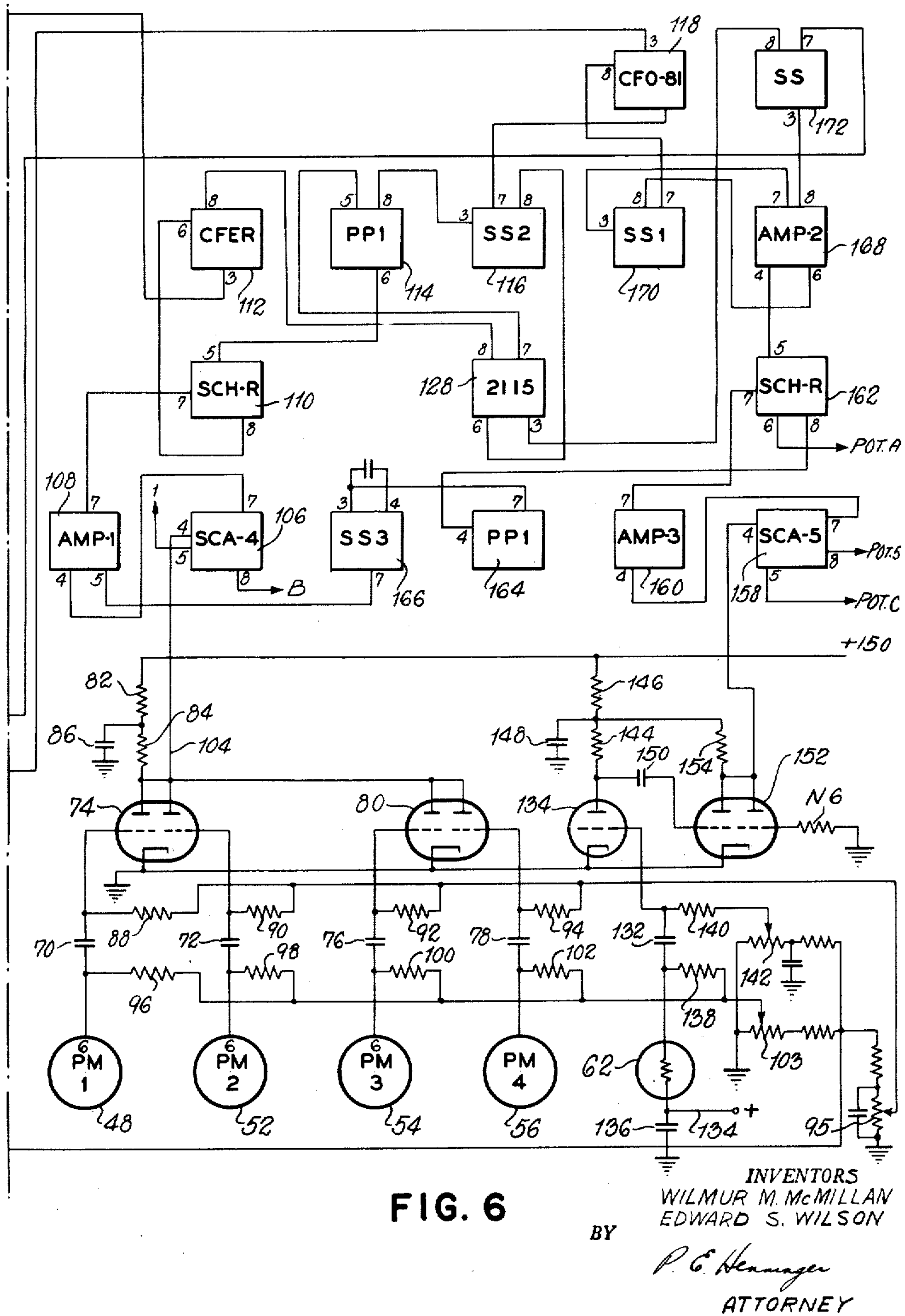

Referring now to Fig. 6, the photomultipliers 48 and 52 are each connected through coupling condensers 70 and 72, respectively, to separate grids of a twin triode mixing tube 74. Similarly the photomultipliers 54 and 56 are connected through condensers 76 and 78 to separate grids of a second twin triode mixing tube 80. The plates of each of the sections of the tubes 74 and 80 are commonly connected to a 150 volt D. C. source through plate load resistors 82 and 84 suitably A. C. by-passed to ground by condenser 86, and the cathodes thereof are directly connected to ground. Grid bias for the individual sections of the tubes 74 and 80 is obtained through the biasing resistors 88, 90, 92 and 94, respectively, connected to a suitable source of variable D. C. potential, conveniently a potentiometer 95. The resistors 96, 98, 100 and 102 serve as the plate load resistors for the photomultipliers 48, 52, 54 and 56, respectively, and are commonly connected to a suitable source of variable D. C. potential, conveniently a potentiometer 103. The plates of each of the sections of the tubes 74 and 80 are also connected to a common output line 104.

In general the successive covering of the slots in the timing track 42 (Fig. 9) results in the successive production of a stepped voltage (Fig. 10) sequentially in each of the photomultipliers 48, 52, 54 and 58. This step function of voltage appears across the plate load resistors 96, 98, 100 and 102. These respective stepped voltage wave outputs from the respective photomultipliers are then differentiated by the action of the respective coupling capacitors 70, 72, 74 and 76, the time constant of the coupling circuits being such as to provide a series of discrete positive pulses (see Fig. 10*a*) corresponding to the individual steps of the stepped voltage, and are applied in the form of positive pulses to the respective grids of the triode mixing tubes 74 and 80. These pulses are then inverted in the mixing tubes 74 and 80 and appear in the common output line 104 thereof as a series of discrete negative pulses corresponding in time to the covering of the respective slots in the timing track 42 (Fig. 9).

In general, the zero pulse corresponding to the zero column on the card being read by the intelligence sensing photocells 40*a* through 40*l* is handled in one manner, the specific pulses 1 to 80 are handled in a separate manner, and the 81st pulse is handled in a third manner. These will now be individually described.

In the storing of intelligence contained on successive sensed cards on a magnetic tape, it is of course necessary to provide an indication of the start of the recorded intelligence contained on a single card. Therefore, the first bit of information to be recorded on the tape for a given card should be a field mark. The zero column is used for such purpose.

As the first card comes through the card track 34 (see Fig. 9), the leading edge thereof covers the photocell 38 and trips the tape start circuit which in turn starts the magnetic tape drive and gets the tape in motion (the tape drive may be of the kind shown in the James A. Weidenhammer et al. United States Patent 2,792,217, dated May 14, 1957 for Tape Feed Mechanism). As the card 36 moves along the track 34, the leading edge thereof covers the first slot in the timing track 42. This covering of the first slot in the timing track 42 results in a diminution of the light transmitted through the timing track prism 46 and onto the cathode surface of the photomultiplier cell PM–1 48. This diminution in light resulting from the covering of the first slot in the timing track 42 is used to generate the zero step of the stepped voltage (see Fig. 10) in photomultiplier PM–1 48. This zero step is then differentiated by coupling condenser 70 and the load resistor 96 to give a positive voltage output pulse. This positive pulse is then applied to the grid of the first section of the twin triode mixing tube 74 and is inverted therein. Consequently there is a negative pulse produced in the common output line 104.

As reference to Fig. 6 will show, the majority of the remaining components of the timing control circuits are shown in schematic block form. These components are preferably in the form of individual pluggable units of more or less standard circuitry to produce a desired effect. For the purpose of convenience and in order not to unduly interrupt and complicate the portions of the disclosure relating to the operation of the component elements, the nature of the particular circuits constituting the components illustrated in block form will be separately and individually described in the subsequent portions of this specification.

The common output line 104 is connected to the input pin 4 of the SCA–4 two-stage sensing cell amplifier 106. This negative pulse input is consequently amplified and inverted in both stages of the SCA–4 amplifier 106 and appears as an amplified negative pulse at the output pin 7. This negative output pulse of the SCA–4 amplifier 106 is then applied to the input pin 4 of the AMP–1 single stage amplifier-inverter 108, wherein it is amplified and inverted and appears as a positive output pulse on pin 7 thereof. The positive output pulse of the AMP–1 inverter 108 is then applied to the input pin 7 of the SCH–R trigger 110. The application of this positive pulse to the SCH–R trigger 110 results in the production of dual positive output pulses appearing at the outpin pins 8 and 5 thereof.

The positive pulse appearing on the output pin of the SCH–R trigger is applied to the input pin 6 of the CFER cathode follower 112. However, as the CFER cathode follower 112 is maintained biased beyond cut-off at this time, the output pulse from pin 8 of the SCH–R trigger 110 cannot pass therethrough. The CFER cathode follower 112 thus serves to block this pulse.

The positive pulse output from pin 5 of the SCH–R trigger 110 is applied to input pin 6 of the PP–1 plate pullover 114. The application of this positive pulse triggers the PP–1 plate pull-over 114 and results in the production of a sharp negative pulse on the output pin 8 thereof. This sharp negative pulse output of the PP–1 plate pull-over 114 is applied to and used to trigger an SS–2 single shot multivibrator 116. Triggering of the SS–2 multivibrator 116 results in the production of a positive rectangular pulse at the output pin 7 thereof. The rectangular pulse is applied to input pin 6 of the CFO–81 cathode follower 118. The application of this positive pulse to the CFO–81 cathode follower 118 results in the production of a positive output pulse on the pin 3 thereof. This positive pulse output of CFO–81 cathode follower 118 is then simultaneously applied to the input pins 5, 4 and 5 respectively of the three IFM inverter stages 120, 122 and 124 (see Fig. 5), respectively. The application of the positive pulse to the IFM inverters 120, 122 and 124 results in pulse inversion and therefore in the production of negative output pulses therefrom appearing on output pins 8, 9 and 8, respectively.

These negative output pulses of the IFM inverter stages 120, 122 and 124 are then applied to the respective input pins 6 of the IC–FJ inverter cathode followers 126*a*, 126*b* and 126*e*. The application of the negative output pulses of the IFM inverters 120, 122 and 124 to the IC–FJ inverter cathode followers 126*a*, 126*b* and 126*e* results in the triggering of those components and the production of a positive pulse on the output pins 4 thereof and on the lines leading to the writing circuits. The subsequent actuation of the writing circuits in accordance with the above pattern results in the coding of the tape in such manner as to indicate a field mark.

The positive pulse output of pin 8 of the SS–2 multivibrator 116 is applied to the input pin 6 of the 2115 trigger 128. The trailing edge of this SS–2 multivibrator 116 output pulse is differentiated and provides a negative tripping pulse for the 2115 trigger 128. Application of the differentiated negative pulse to the 2115 trigger 128 results in cutting "off" one of the tubes contained therein and the circuit constants associated therewith are such that the tube is maintained cut "off" for a predetermined period of time. As the tube therein is sharply cut "off," the 2115 trigger 128 produces a rectangularly shaped positive voltage pulse of predetermined and relatively long duration at the output pin 8 thereof. The positive output pulse from pin 8 of the 2115 trigger 128 is then applied to the input pin 8 of the CFER cathode follower 112, which, as mentioned above, serves to block the passage of the positive output pulse from pin 8 of the SCH–R trigger 110 relating to the so-called "zero" mark. The application of this positive pulse to the CFER cathode follower 112 serves to unblock that component to permit the application of a subsequently applied positive pulse to the input pin 6 thereof to render that component active.

The CFER cathode follower 112 is now unblocked for the subsequent timing pulses corresponding to card columns 1 through 80. The actuation of the 2115 trigger 128 as described above unblock the CFER cathode follower 112 also results in a blocking of the PP–1 plate pull-over 114 through the connections of pins 7 and 5, respectively. This prevents the subsequent application of a positive pulse output from pin 5 of SCH–R trigger 110 to the input pin 6 thereof from triggering the PP–1 plate pull-over 114 and thus serves to block said unit from passing the subsequent timing pulses.

In a manner similar to that described above, the subsequent timing pulses, numbers 1 through 20, are generated in the PM–1 photomultiplier 48 and condenser 70 and resistor 96; numbers 21–40 in PM–2 photomultiplier 52 and condenser 72 and resistor 98; numbers 41–60 in PM–3 photomultiplier 54, condenser 76 and resistor 100; and 61 through 80 in PM–4 photomultiplier 56, condenser 78 and resistor 102. In each case the stepped voltage wave is differentiated, and the discrete pulses resulting therefrom are amplified in either of the twin triode mixing stages 74 and 80. The resulting negative pulse voltage output is applied to the input pin 4 of the SCA–4 two-stage sensing amplifier 106. The amplified negative pulse output thereof is inverted in AMP–1 inverter 108 and the resulting positive pulse output at pin 7 thereof is used to trigger the SCH–R trigger 110. This positive voltage pulse is sharpened in the SCH–R trigger 110 and the positive pulse output thereof from pin 8 is applied to the input pin 6 of the CFER cathode follower 112.

As this component is now unblocked, the application of positive pulses to the input pin 6 thereof causes said tube to conduct and results in the production of corresponding positive output pulses on pin 3 thereof. These discrete pulses correspond in time to the sensing of columns 1 through 80 on the card by the intelligence sensing photocells 40a through 40l. The discrete positive pulse outputs of CFER cathode follower 112 are then simultaneously applied to the input pins 8 of the seven S–9A gate units 26a through 26g, each of which serve to control a writing head for the seven channels on the tape.

As described generally above, the S–9A gate units 26a through 26g are individual dual control grid switching circuits requiring the application of simultaneous pulses to both control grids thereof. As the above described timing pulses are applied to one of said control grids, i. e. at pin 8, in each instance, the simultaneous application of a pulse to the other control grid, i. e. at pin 6 thereof, representative of translated and transformed intelligence, will result in the unblocking of the S–9A gates 26a through 26g and the passage of the coded intelligence pulses on to the proper tape writing heads.

The covering of the 81st slot in the timing track 42 is sensed by a separate PC–13 photocell unit 62 connected thereto by a suitable light transmitting channel such as a Lucite rod. The diminution in the light reaching the PC–13 photocell 62 results in the production of a negative output pulse therefrom which is applied through a coupling condenser 132 to the grid of a triode amplifier 134. One side of the PC–13 photocell 62 is connected to a suitable source of D. C. potential 134 with an A. C. bypass to ground via condenser 136. The other side of the photocell 62 is connected to the variable voltage source 103 through the load resistor 138. Grid bias for the triode amplifier 134 is provided through the biasing resistor 140 and the variable voltage source 142. The plate of tube 134 is connected to a 150 volt D. C. source through the load resistors 144 and 146 suitably A. C. by-passed to ground by the condenser 148.

The negative pulse input to the triode amplifier 134 is inverted therein and the positive pulse output therefrom is applied through the coupling condenser 150 to the common grid of the dual tube 152. The dual tube 152 has a grounded cathode and the plate thereof is connected to the 150 volt D. C. supply through the resistors 154 and 146. The grid thereof is also connected to ground through resistor 156.

The application of the positive input pulse to the single stage triode amplifier 152 results in the production of a negative output pulse therefrom which is directly applied to the input pin 4 of the SCA–5 two-stage amplifier 158. The amplified negative output pulse appearing at the output pin 7 of the SCA–5 amplifier 158 is then applied to the input pin 4 of the AMP–3 single stage inverter amplifier 160. The AMP–3 inverter 160 produces an inverted pulse at pin 7 thereof, i. e. a positive output pulse. This positive pulse is then applied to the input pin 7 of the SCH–R trigger 162 and serves to trip said unit. The tripping of the SCH–R trigger 160 by the positive input pulse applied to pin 7 thereof results in the production of a positive output pulse on pin 8 thereof and a negative output pulse on pin 5 thereof.

The positive pulse output appearing at the output pin 8 of SCH–R trigger 162 is used to trip the PP–1 plate pull-over 164 by application to the input pin 4 thereof. The tripping of the PP–1 plate pull-over 164 provides a sharp negative output pulse on the output pin 7 thereof which is then applied to the input pin 3 of the SS–3 single shot multivibrator 166. The application of this negative pulse serves to trip the SS–3 single shot multivibrator 166 to produce a long negative pulse output at the output pin 7 thereof. This long negative pulse is directly applied to input pin 5 of AMP–1 inverter-amplifier 108 and serves to block said inverter-amplifier until the next card in the series reaches the sensing station.

The negative pulse appearing at the output pin 5 of the SCH–R trigger 162 is directly applied to the input pin 4 of the AMP–2 inverter-amplifier 168. This pulse is inverted in AMP–2 inverter 168 and appears as a positive pulse on the output pin 7 thereof. This output pulse is directly applied to the input pin 3 of SS–1 single shot multivibrator 170 and serves to trip this multivibrator unit. The tripping of the SS–1 multivibrator 170 results in the production of a positive pulse output on pin 7 thereof which is in turn directly applied to the input pin 8 of the CFO–81 cathode follower 118. The application of this positive pulse renders the CFO–81 cathode follower 118 conductive and provides a positive pulse output at the output pin 3 thereof. This positive pulse output of the CFO–81 cathode follower 118 is then simultaneously applied to the input pins 5, 4 and 5, respectively, of the three IFM inverter stages 120, 122 and 124 with the same effect as was described above in the case of the zero pulse. Thus the 81st timing pulse serves to provide a field mark of predetermined coding on the tape similar to that produced for the "zero" timing pulse.

The trailing edge of the positive pulse output of the SS–1 single shot multivibrator 170 is differentiated and the negative pulse resulting therefrom is applied to the input pin 6 of the AMP–2 inverter-amplifier 168. This negative pulse input to AMP–2 is amplified and inverted therein and appears as a positive pulse output on pin 8 thereof. This positive pulse is then directly applied to the input pin 3 of the SS single shot multivibrator 172. The application of this positive pulse to the SS multivibrator 17 serves to trip the unit and its actuation provides a positive pulse output at pin 7 thereof which serves as the 82nd timing pulse. This positive pulse representing the 82nd timing mark is then applied to the input pin 4 of the IFM inverter stage 174 and inverted therein. The negative pulse output appearing at pin 9 of the IFM inverter stage 174 is applied to the input pin 6 of the IC–FJ inverter cathode follower 126f. This negative pulse triggers the IC–FJ inverter cathode follower 126f and results in the production of a positive pulse on the output pin 4 thereof and on the line leading to the writing circuits.

The subsequent actuation of the writing head of the particular writing circuit results in the coding of the tape to indicate a record mark denoting the end of the sensed and translated intelligence for a given card.

The SS single shot multivibrator 172 also provides a negative overshoot on the trailing edge of the positive output pulse on pin 8 thereof. This negative overshoot of the positive output pulse is applied to the input pin 3 of the 2115 trigger 128 and serves to reset said trigger. Resetting the 2115 trigger 128 results in the production of a negative pulse at output pin 8 thereof and a positive pulse at output pin 7 thereof. The positive pulse at pin 7 is applied to the input pin 5 of the PP–1 plate pull-over 114 and serves to unblock said unit. The negative pulse at pin 8 is applied to the input pin 8 of the CFER cathode follower 112 and serves to block the same for the next input pulse receiver on input pin 6 thereof. The system is thus set up to receive a new card and the "zero" mark thereon. A new card starts a new cycle of operation exactly similar to that described above.

*Component circuit elements*

Figure 5:
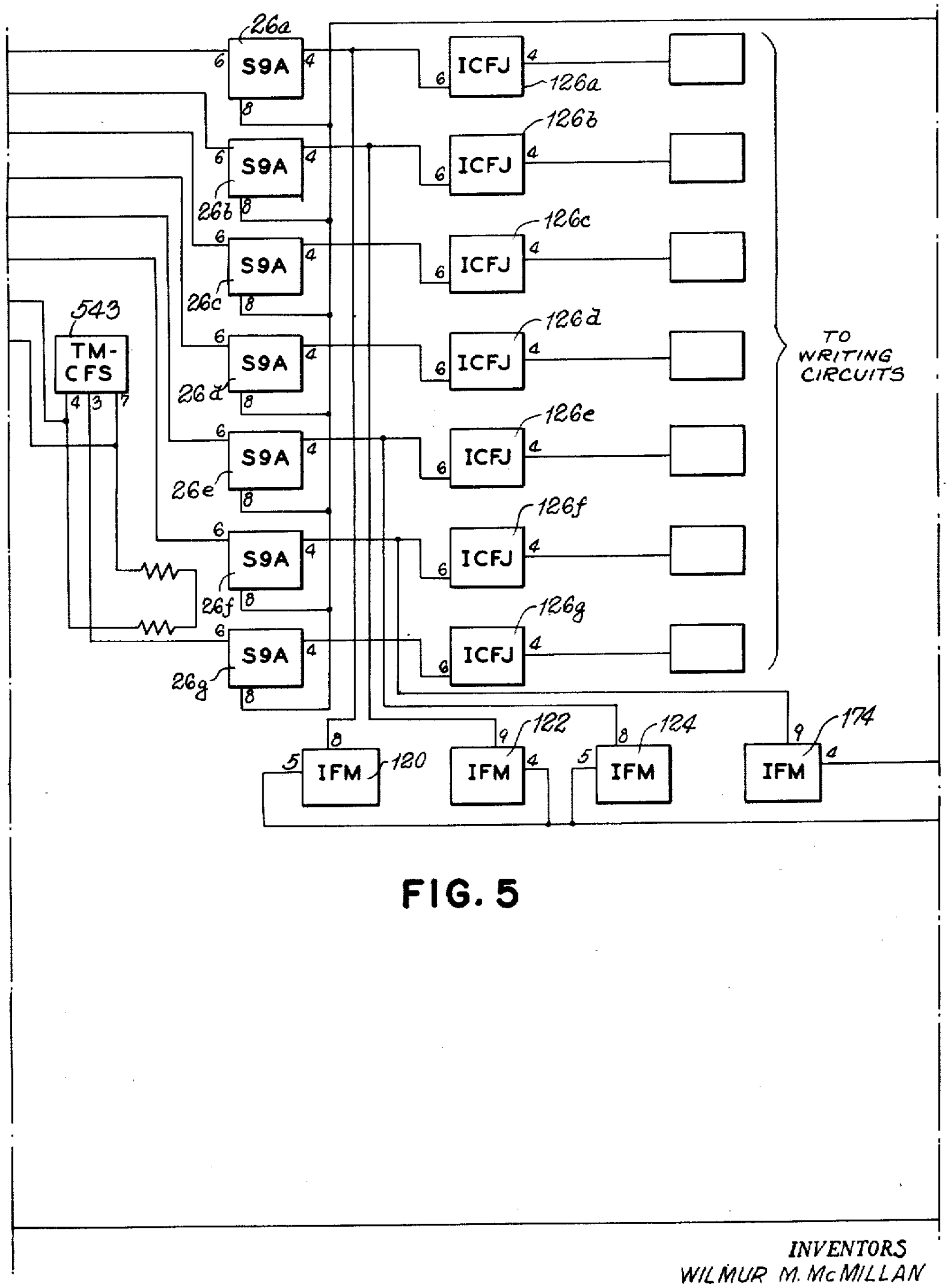

In order to more fully describe the invention, the nature of the circuits schematically illustrated in block form in Figs. 6 and 5 and referred to above will now be individually described.

*SCA–4.—Sensing cell amplifier.*—The SCA–4 sensing cell amplifier (Fig. 12) is preferably a pluggable unit comprising two stages of capacitor coupled triode amplifiers.

The negative pulse input in applied through pin 4 and is coupled to the grid of the first stage 190 through a coupling capacitor 192 and a parasitic suppressor resistor 194. The cathode of the first stage 190 is connected to the pin 6 and is externally grounded. Pin 5 is connected to an external noise control potentiometer adapted to provide a variable negative D. C. potential. Connected to the pin 5 across the resistor 194 are a grid return resistor 196 and a diode rectifier 198. The anode of the first stage 190 is connected to an external 150 volt D. C. plate supply voltage through the plate load resistor 200 and the pin 3. The anode of the first stage 190 is coupled to the grid of the second stage 201 through a coupling condenser 202 and a parasitic suppressor resistor 203. Also connected to the grid of the second stage 201 through the suppressor resistor 203 and the grid return resistor 204 is a source of variable negative D. C. potential obtained through pin 8 which is connected to an external potentiometer for noise suppression control. The cathode of the second stage 201 is connected directly to ground, and the plate or anode thereof is connected to an external 150 volt D. C. plate supply voltage through plate load resistors 205 and 206 and pin 9. The output of the SCA–4 amplifier is taken from the output pin 7 which is connected in the plate line for the second stage 201 intermediate the resistors 205 and 206.

The diode rectifier 198 in the grid circuit of the first stage serves to suppress the positive pulse obtained from the trailing edge of the card moving along the timing track. The bias voltage on both stages also serves to suppress this unwanted pulse.

The characteristics of the SCA–4 sensing cell amplifier are such that the negative input wave form appearing at the input pin 4 is reproduced in the same or in substantially the same form but in an amplified condition at the output pin 7, there being no overall inversion due to the fact that there are two stages of amplification. The tube may be a type 12AX7.

*AMP–1 amplifier-inverter.*—The AMP–1 amplifier-inverter (Fig. 13) is preferably a pluggable unit comprising a single stage of amplification and as such providing for an inversion of the input wave form. The tube may be a type 5965.

Referring to Fig. 13 a negative pulse input is adapted to be applied through input pin 4 and is applied to the grid of the triode tube 207 through a coupling condenser 208. The cathode of the tube 207 is grounded. Bias for the grid 208 is provided by a voltage divider network which includes the resistor 209 connected to the pin 6 which in turn is connected to a —250 volt D. C. supply, and the resistor 210 connected to the pin 5 which is in turn connected to an external potentiometer adapted to provide anywhere from +25 to +150 volts. The plate of the tube is connected to the pin 3 through a plate load resistor 211. The pin 3 is adapted to be connected to an external plate supply voltage source of +150 volts D. C. The inverted output wave form is obtained from pin 7 directly connected to the plate of the tube 207.

In operation of the circuit, the bias voltage obtained through the above described voltage divider network is such that the tube 207 is normally conducting until a negative pulse input signal is applied to the grid through the input pin 4. The change in current flow through the tube 207 results in the production of a positive voltage pulse on the output pin 7. Therefore, the described circuit is such that a negative pulse input wave form appearing at input 4 will be amplified and inverted through the single stage of amplification and will appear in amplified and inverted form at the output pin 7.

*SCA–5 amplifier.*—The SCA–5 amplifier is preferably a pluggable unit comprising two stages of condenser coupled triode amplification. The tube may be a type 12AX7.

Referring to the drawings (Fig. 14) a negative pulse input is adapted to be applied to the input pin 4 and is applied directly to the grid of the first triode tube 212 through a coupling condenser 213. The cathodes of both the first stage tube 212 and the second stage tube 214 are directly connected to the grounded pin 6. Grid bias for the first stage 212 is supplied through a resistor 215 connected to the pin 5 which in turn is connected to an external potentiometer adapted to supply a controlled negative D. C. potential. The resistor 215 is by-passed by a diode rectifier 216 adapted to suppress any positive pulse input which might result from an overshoot caused by the trailing edge of the card.

A high frequency noise by-pass condenser 217 is also connected between the grid of the first stage 212 and ground. The plate of the first stage 212 is connected to a plate voltage source of +150 volts through the plate load resistor 218 and the pin 3. The plate of the first stage 212 is also provided with a high frequency noise by-pass by the grounded capacitor 219. The plate of the first stage 212 is coupled to grid of the second stage tube 214 by a coupling capacitor 220. Bias for the second stage is supplied by a resistor 221 connected to the output pin 8 which in turn is connected to a potentiometer adapted to provide a controllable source of positive D. C. potential. The plate of the second stage tube 214 is connected to a 150 volt D. C. plate supply voltage through the plate load resistor 222 and the output pin 9. The output wave form is obtained from the pin 7 directly connected to the plate of the second stage 214.

In operation this circuit is a conventional two-stage amplifier adapted to receive a negative input pulse on input pin 4 and provide an amplified negative output pulse on output plug 7.

*AMP–3 amplifier-inverter.*—The AMP–3 amplifier-inverter (Fig. 15) is preferably a pluggable unit comprising a single stage of amplification. The tube employed may be one-half of a type 12AV7 tube. Its function in the assembled unit is to serve as a shaping circuit as well as an amplifier-inverter.

Referring to Fig. 15, a negative input pulse is adapted to be applied through the input pin 4 and to the grid of the normally conducting triode tube 223 through a coupling condenser 224. Connected intermediate the grid and the grounded pin 5 is a grid return resistor 225. The grid is also by-passed to ground by a capacitor 226 connected to the grounded pin 6. The cathode of the tube 223 is also grounded. The plate of the tube 223 is connected to a +150 volt D. C. plate supply voltage through the plate load resistors 227 and 228 and the pin 3.

In operation of the tube, a negative input pulse applied to the input pin 4 is amplified in the normally conducting tube 223 and an amplified and inverted wave form is taken from the output pin 7 directly connected to the plate of the tube.

*PP–1 plate pull-over unit.*—The PP–1 plate pull-over (Fig. 16) is preferably a pluggable unit which is essentially a single stage amplifier having no plate load resistors in the plate circuit thereof. The tube employed may be a type 5965. In operation the output wave form appearing at the plate when the tube starts to conduct provides a very sharp negative pulse which can be used to trigger or cut "off" an associated circuit.

Referring to Fig. 16 it will be seen that the pluggable unit there illustrated is a dual unit of two basically identical circuits. For the purposes of convenience, we will only describe one of such units. As there illustrated, the triode tube 229 in question is normally cut "off" and the voltage appearing at the plate thereof and also at the output pin 7 is high. Application of a positive pulse through the input pin 4 is applied to the grid of the tube 229 through a coupling condenser 230. The grid is normally biased to keep the tube 229 cut "off" by a voltage divider network including the resistors 231 and 232 connected to the pins 3 and 9 respectively. The pins 3 and 9 are adapted to be connected to a +150 and −100 volt external D. C. supply. The plate of the tube 229 is directly connected to the output pin 7 and the cathode thereof is grounded.

Application of a positive pulse to the input pin 4 causes the tube 229 to conduct. When the tube starts conducting, the voltage appearing at the plate thereof drops sharply and provides a sharp negative pulse which can be used to trigger or cut "off" an associated unit. As this unit is in essence a single stage amplifier, it also serves to invert the positive pulse input wave form.

*AMP–2 amplifier and plate pull-over.*—The AMP–2 amplifier-plate pull-over (Fig. 17) is preferably a pluggable unit comprising an amplifier having no plate load resistors in the plate circuit thereof. The tube may be a type 5965. In operation the output wave form appearing at the plate when the tube starts to conduct provides a very sharp negative pulse which can be used to trigger or cut "off" an associated circuit.

Referring to Fig. 17 it will be seen that the pluggable unit there illustrated is a dual unit of two symmetrical circuits. For the purposes of convenience, only one of such circuits will be described. Referring to the drawing, a positive pulse input wave is adapted to be applied through the input pin 4 to the grid of the tube 233 through a coupling condenser 234. The tube 233 is normally maintained in a cut "off" condition, the necessary bias being supplied by a voltage divider network which includes the resistor 235 connected to a 150 volt positive D. C. source through the pin 3, and the resistor 236 which is connected to a negative 100 volt D. C. source through the pin 5. The plate of the tube 233 is connected directly to the output pin 7 and the cathode thereof is grounded.

In operation of the circuit, the application of a positive pulse to the input pin 4 serves to start the tube 233 conducting. The conduction of the tube 233 and the accompanying drop in the voltage at the plate thereof results in the production of a sharp negative pulse appearing at the output pin 7. Actually there is no amplification produced in this stage, as its main purpose is to serve as a plate pull-over unit to produce a sharp negative pulse output used to trigger a multivibrator circuit disposed adjacent thereto.

The other half of the illustrated circuit is exactly the same as that described and no further description need be given.

*SCH–R trigger.*—The SCH–R trigger circuit (Fig. 18) herein disclosed is essentially a single shot multivibrator of a type that will accept a ragged input wave form and will produce a well-defined sharp wave form in its output circuit of definite pulse duration. The tube employed may be a type 6J6.

Referring to the drawing a positive pulse is adapted to be applied through the input pin 7, a coupling condenser 237 and a parasitic suppressor resistor 238 to the grid of the tube 239. The grid of the tube 239 is normally biased beyond cut-off by a negative biasing and clipping voltage applied through the resistor 240 and the pin 6 which is adapted to be connected to an externally disposed control potentiometer. The cathode of the first stage tube 239 is connected to ground through a resistor 241. The plate of the first stage 239 is connected to a D. C. plate voltage supply of +150 volts through pin 9 and the plate load resistors 242 and 243. Connected intermediate the resistors 242 and 243 is an output pin 5 which may be tapped as desired for the production of a negative shaped pulse.

The cathode of the second stage 244 is connected to ground through the common cathode resistor 241. The plate of the second stage 244 is connected to the +150 volt D. C. plate supply through pin 9 and plate load resistors 245 and 246, respectively. The plate of the second stage 244 is coupled to the grid of the first stage 239 through a coupling condenser 247 which serves to decrease the transition time of the multivibrator and produce a more nearly vertical wave form during the transition. The grid of the second stage 244 is connected to a source of 100 volt negative D. C. potential through the pin 3, the grid return resistor 248 and the parasitic suppressor resistor 249. The plate of the first stage 239 is coupled to the grid of the second stage 244 via a timing circuit which includes the resistor 250 and the condenser 251. The output wave form is obtained from the plate of the second stage 244 via the output pin 8.

In operation of this circuit, the first stage 239 is normally cut "off" by action of the biasing voltage supplied through the pin 6. The imposition of a positive pulse through the input pin 7 causes the first stage to start conducting and the flow of current through the plate load resistors 242 and 243 results in the production of a negative pulse appearing on the plate of said first stage 239. This pulse is transmitted through the timing circuit which includes the resistor 250 and condenser 251 to the grid of the normally conducting second stage 244. The application of this negative pulse to the grid of the second stage 244 causes the conduction of that stage to decrease and the voltage appearing at the plate thereof to increase. This increase in voltage appearing on the plate is transmitted back to the grid of the first stage 239 and there reinforces the positive pulse input wave form and results in a more rapid and steeper slope for the corresponding output wave. This, of course, as is conventional in multivibrators, accelerates the action and results in a rapid cutting "off" of the second stage.

In summary, therefore, the application of a positive input pulse to the input pin 7 results in the production of a positive shaped output pulse at the output pin 8 of predetermined duration. The characteristics of the circuit and the circuit constants used therein are such that a ragged input wave form appearing at input pin 7 will appear as a sharp output wave form of controlled duration at the output pin 8.

*SS, SS–1 and SS–2 single shot multivibrators.*—The SS, SS–1 and SS–2 single shot multivibrators (Fig. 19) are preferably pluggable units comprising a single shot multivibrator using a dual type 6J6 tube.

As illustrated in Fig. 19 a positive pulse input is adapted to be applied to the grid of the first tube 252 through the input pin 6, a coupling condenser 253 and a parasitic suppressor resistor 254. The first tube 252 is normally cut "off," and the necessary biasing voltage therefor is obtained through a voltage divider network including the biasing resistor 255 connected to a negative 100 volt D. C. source through the pin 5 and the resistor 256 connected to a 150 volt positive D. C. source through the resistors 257 and 258 and the pin 9. The resistor 256 is suitably bypassed by a condenser 259. The plate of the first tube 252 is connected to a +150 volt D. C. source through the plate load resistors 260 and 261 and the pin 9. The cathode thereof is grounded.

As the first tube 252 is normally cut "off," application of a positive pulse to the grid through the input pin 6 starts to render the tube conducting. The increase in current flow through the plate load resistors 260 and 261 results in the production of a negative pulse on the plate of the tube 252. This negative pulse is transmitted by a coupling condenser 262 to the grid of the normally conducting tube 263 through a parasitic suppressor resistor 264. The second tube 263 is normally conducting and the bias voltage therefor is obtained from the +150 volt D. C. source through the plug 9 and the resistor 265. The plate of the second tube 263 is connected to a +150 volt D. C. source through the pin 9 and the plate load resistors 257 and 258. The cathode thereof is grounded. The application of the negative pulse obtained from the plate of the tube 252 to the grid of the tube 263 is such that the current flow through said tube 263 starts to decrease. This decrease in current flow therethrough results in the production of a positive voltage pulse on the plate thereof. This positive wave form appearing on the plate of tube 263 is transmitted via the coupling condenser 259 and the resistor 256 and is applied to supplement and reinforce the input positive pulse on the grid of the first tube 252. The reinforcement of the input pulse, of course, accelerates the action and results in a rapid cutting "off" of the second tube 263 and in the production of a sharp output wave therefrom.

The multivibrator is reset by the application of a sharp negative pulse to the input pin 3 thereof from the previously described AMP-3 plate pull-over unit. This negative pulse applied to the plate of the first stage will reverse the multivibrator and reset the first stage in a non-conducting condition.

It will thus be seen that in operation of the circuit, application of a positive pulse on the input pin 6 of the first stage will result in the production of a positive output pulse appearing at pin 7 having a steeper leading edge and a duration determined by the time constant of condenser 22 and resistor 23.

The SS, SS-1 and SS-2 multivibrators are identical in circuit configuration, the only difference lying in the actual values of certain of the circuit elements.

*SS-3 single shot multivibrators.*—The SS-3 multivibrator (Fig. 20) is preferably a pluggable unit comprising a single shot multivibrator using a dual type 6J6 tube. As reference to the drawing will show, the circuit is almost identical with those of the SS, SS-1 and SS-2 multivibrators described above and illustrated in Fig. 19. In the interests of brevity, therefore, only the points of difference will be noted, it being understood that as to the remainder, the portions of the disclosure relating to the SS, SS-1 and SS-2 units are applicable hereto. Consequently, the same reference numerals are used both here and in Fig. 19. The points of difference to be noted are (*a*) the coupling condenser 262 is connected intermediate the plate of tube 252 and the grid of tube 263 externally of the unit through pins 3 and 4; (*b*) the tapped output pin 8 is connected into the plate circuit of the first tube instead of the second; and (*c*) there is provided a diode rectifier 266 connected intermediate the grid of tube 263 and ground.

*2115 trigger.*—The 2115 trigger circuit herein disclosed (Fig. 21) is essentially a symmetrical flip-flop multivibrator adapted to provide output pulses of predetermined polarity and duration.

Referring to the drawing a negative input pulse is adapted to be applied to the grid of the normally conducting first tube 267 through the pin 8, coupling condenser 268 and parasitic suppressor resistor 269. Bias for the grid of the first tube 267 is supplied through a voltage divider network including the resistors 270 and 271 connected to a +150 volt D. C. supply voltage through pin 9 and the resistor 272 connected to a negative D. C. source through pin 5. The plate of the first tube 267 is connected to the +150 volt D. C. plate supply source through the plate load resistor 273 and the pin 9. The cathode thereof is grounded.

In a similar manner the normally cut "off" second tube 274 is provided with a grid circuit having a parasitic suppressor resistor 276 and coupling condenser 277 connected intermediate the grid and its input pin 3. Bias for the grid is supplied by a voltage divider network including the resistor 278 adapted to be connected to a source of negative D. C. potential through the pin 4 and the resistors 279 and 273 connected to the plate supply voltage through the plate load resistor 271 and the pin 9, and the cathode thereof is grounded. The grids of both tubes are connected by a condenser 281.

The above circuit is basically a stable multivibrator of the "flip-flop" type. That is, it will remain in a given operating condition with one tube conducting and the other cut "off" until tripped by an externally applied pulse of sufficient magnitude.

In operation therefore if it be assumed that the first tube is normally conducting, the application of a negative pulse on the grid thereof through the input pin 6 results in a diminution of current flow therein and in the production of an increasing voltage on the plate thereof. This increase in plate voltage is transmitted to the grid of the cut "off" second tube 274 through the coupling condenser 275, and starts the second tube 274 to conduct. The commencement of conduction in the second tube 274 results in a decrease in the plate voltage thereon, and said decreasing voltage is applied to reinforce the input pulse on the first tube grid through coupling condenser 280. As in conventional multivibrator action, this results in a rapid cut "off" of the first tube 267 and rapid conduction of the second tube 274. This action results in the production of a positive output pulse on pin 8 and a negative output pulse on pin 7. The unit will then remain in the above condition until tripped by a negative pulse of sufficient amplitude applied to the input pin 3 of the second tube 274 at which time the action will reverse and the unit will return to its original operating condition.

As the duration of the output pulses is dependent upon external triggering, the unit is readily adaptable to use as a source of blocking potential for other circuit components.

*IFM inverter-plate pull-over.*—The IFM inverter-plate pull-over unit as illustrated in Fig. 22 is preferably a pluggable unit comprising a single stage amplifier or inverter having no plate load resistor. This component is used as a plate pull-over circuit for providing a sharp triggering pulse for an adjacent multivibrator. The tube employed may be a type 6J6.

Referring to Fig. 22 it will be seen that the pluggable unit there illustrated is a dual unit formed of two separate similar circuits. For the purposes of convenience, only one of the circuits will be described. A positive input pulse is adapted to be applied through the input pin 5 to the grid of the tube 282 through a coupling condenser 283 and a parasitic suppressor resistor 284. The tube 282 is normally biased beyond cut "off," and the necessary grid bias therefor is supplied through a voltage divider network including the resistor 285 connected to grounded pin 7 and the resistor 286 connected to a 100 volt negative D. C. supply through the pin 6. The plate of the tube 282 is directly connected to the output pin 8 and the cathode thereof is grounded.

In operation of the circuit, the tube 282 is normally cut "off." Application of a positive voltage pulse of sufficient amplitude to the input pin 6 to cause the tube 282 to conduct results in the production of a sharp negative voltage pulse on the output pin 8. This negative voltage pulse may then be readily used to trip an adjacent circuit component.

*S-9A switch.*—The S-9A switch as illustrated in Fig. 23 is preferably a pluggable unit comprising a single stage unit requiring the simultaneous application of two positive pulse inputs to separate control grids to render the stage conductive and thus provide a desired output wave form. The tube employed may be a type 1680.

Referring to the drawing, there is provided a multi-element tube 287 having dual control grids. One of the control grids is connected to the input pin 6 through a coupling resistor 288 by-passed by capacitor 289 and a parasitic suppressor resistor 290. Bias for this grid is supplied through the resistor 291 connected to a negative 250 volt source through the pin 7. The second control grid is connected to the input pin 8 through the coupling condenser 292 and the parasitic suppressor resistor 293. Bias for this grid is supplied by a voltage divider network which includes the grounded resistor 294 and the resistor 295 connected to a negative 100 volt D. C. supply through the pin 9. The cathode of the tube 287 is grounded. The screen grids thereof are biased through a suppressor resistor 296 connected to a positive 75 or 100 volt D. C. source through the pin 5. The plate of the tube 287 is connected to a +150 volt D. C. plate supply through pin 3 by a plate load resistor 297. The output of the tube 297 is taken from the output pin 4 directly connected to the plate thereof.

In operation of the switch, the tube 287 is normally cut "off," and the circuit constants are such that in order to render the tube conductive, positive pulses of sufficient amplitude must be simultaneously applied to both the input pins 6 and 8. When the required positive pulses are simultaneously applied, the tube 287 is rendered conductive and the increase in current flow therethrough results in the production of a negative pulse at the output pin 4. As such, the unit adequately functions as a switch or gate requiring simultaneously applied dual inputs in order to render the tube conductive and to provide the desired output pulse.

*CFER cathode follower.*—The CFER cathode follower unit (Fig. 24) is preferably a pluggable unit comprising a dual type 5687 tube cathode follower unit adapted for impedance matching and power transfer purposes.

As illustrated in the drawings, there are provided two tubes 298 and 299 having their plates connected to a common +150 volt D. C. plate supply through pin 9, and their cathodes connected to ground through a common resistor 300. A single output is obtained from the pin 3 connected to the common cathodes. The input to the tube 298 is provided through the coupling condenser 301 and resistor 302 connected intermediate the grid thereof and the input pin 6. The input to the second tube 299 is provided through said condenser 301 and the resistor 303. Bias for both tubes is supplied through a voltage divider network which includes the resistor 304 connected to a negative 105 volt D. C. source through the pin 7 and the resistor 305 connected to the pin 8.

In operation the condition of the circuit is dependent upon the potential applied to the pin 8. The tubes 298 and 299 are normally cut "off" and the determination of whether or not they will be rendered conductive by the application of a positive pulse applied to the input pin 6 will depend upon the potential applied to the pin 8.

If it be assumed that there is no blocking potential applied to the pin 8, the application of a positive pulse input wave to the grid of both tubes 298 and 299 through the pin 6 will render both tubes conductive and will produce a positive output pulse at the output pin 3. If a blocking potential be applied to the pin 8, the circuit will not respond to the positive input pulse and will thus serve as a blocking component.

*CFO–81 cathode follower.*—The CFO–81 cathode follower (Fig. 25) is preferably a pluggable unit comprising a dual input single output cathode follower which may comprise a type 5687 tube.

The illustrated circuit includes two tubes 310 and 311 having their plates commonly connected to a +150 D. C. plate supply source through the pin 9. The cathodes of both stages are commonly connected to ground through the resistors 312 and 313, respectively. An input pulse adapted to be applied to the grid of the first tube 310 is fed through the input pin 8, a coupling condenser 314 and a parasitic suppressor resistor 315. Grid bias for the first stage 310 is obtained through a voltage divider network including the resistor 316 connected to the plate supply potential through the pin 9 and the resistor 319 connected to a negative 100 volt D. C. supply through the pin 7. The input voltage pulse for the second tube 311 is obtained from the input pin 6 and is applied to the grid through a coupling condenser 318 and a parasitic suppressor resistor 319. Bias for the tube 311 is obtained by a voltage divider network which includes the resistor 320 connected to pin 9 and the resistor 321 connected to the pin 7.

In operation of this circuit, both the tubes 310 and 311 are normally operating at cut-off. The application of a positive pulse to either of the input pins 8 or 6 will cause the respective tubes to conduct and will provide a single positive output pulse on the common output pin 3 which is connected to the cathodes of both the tubes.

*IC–FJ inverter-cathode follower.*—The IC–FJ inverter-cathode follower is preferably a pluggable unit comprising a single inverter stage directly coupled to a cathode follower as illustrated in Fig. 26. The tube may be a type 5687.

As illustrated in the drawing, a negative pulse input wave form is adapted to be applied through the input pin 6 to the grid of the normally conducting inverter tube 325 through a coupling condenser 326 and a parasitic suppressor resistor 327. The tube 325 is normally conducting and the necessary bias therefor is supplied through the resistor 328 connected to a +150 volt D. C. plate supply through the pin 7. The plate of the tube 325 is also connected to pin 7 through the plate load resistors 329 and 330 and the cathode thereof is grounded.

The second stage is a conventional cathode follower in which the tube 331 has its plate directly connected to the pin 7 and its cathode connected to ground through the resistors 332 and 333. The grid of the tube 331 is coupled to the plate of the tube 325 through the parasitic suppressor resistor 334 and the coupling resistor 335 by-passed by the capacitor 336. The tube 331 is normally cut "off" and the necessary bias therefor is supplied through a voltage divider network which includes the above mentioned resistors 329—331 and the resistor 337 connected to a negative 250 volt D. C. source through the pin 5.

In operation of the circuit, the tube 325 is normally conducting, and the application of a negative pulse to the grid thereof serves to cut the tube "off." The cutting "off" of the tube results in a cessation of current flow through the plate circuit and in a rise in voltage on the plate thereof. This increase in voltage or positive pulse appearing at the plate of the first stage 325 is applied to the grid of the second stage 331 through the coupling resistor 335. As the second stage 331 is normally in a cut-off condition, the application of the positive voltage pulse to the grid thereof starts the tube conducting and a positive voltage pulse is taken from the output pin 4 directly connected to the cathode thereof.

*Data translation and transformation component*

*Sensing and shaping units.*—The general function of the sensing and shaping units of the data translation and transformation component is to provide suitably shaped pulses corresponding to the coded intelligence on the sensed cards for the driving of the code translation matrix.

As previously described, the intelligence sensing unit is illustrated in Fig. 9 and includes a single column of 12 individual intelligence sensing photocells 40*a* through 40*l* suitably located in the card track 34 to sense the punched designations column-by-column in the twelve rows of a standard punched record card.

Figure 2:
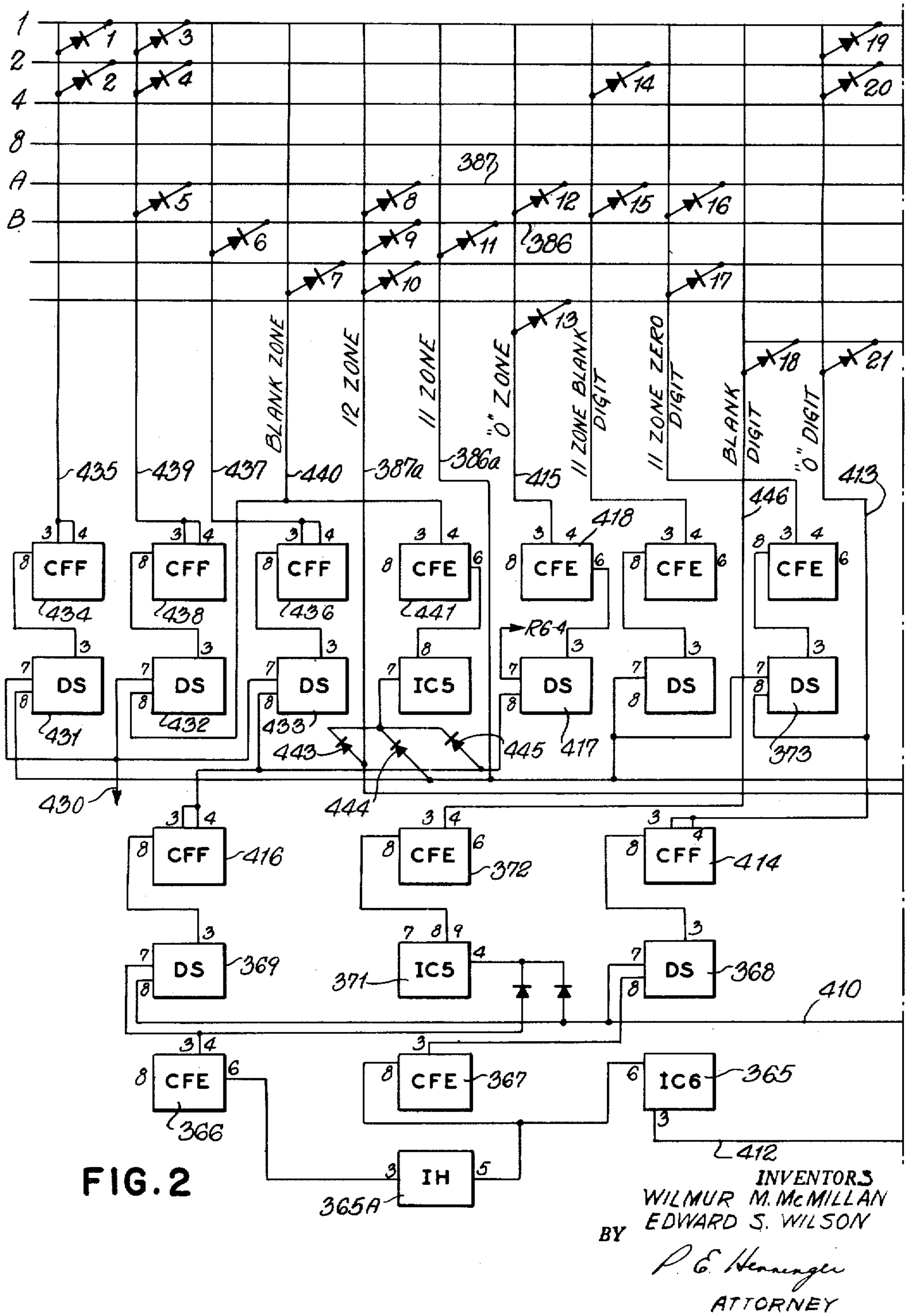
Figure 3:
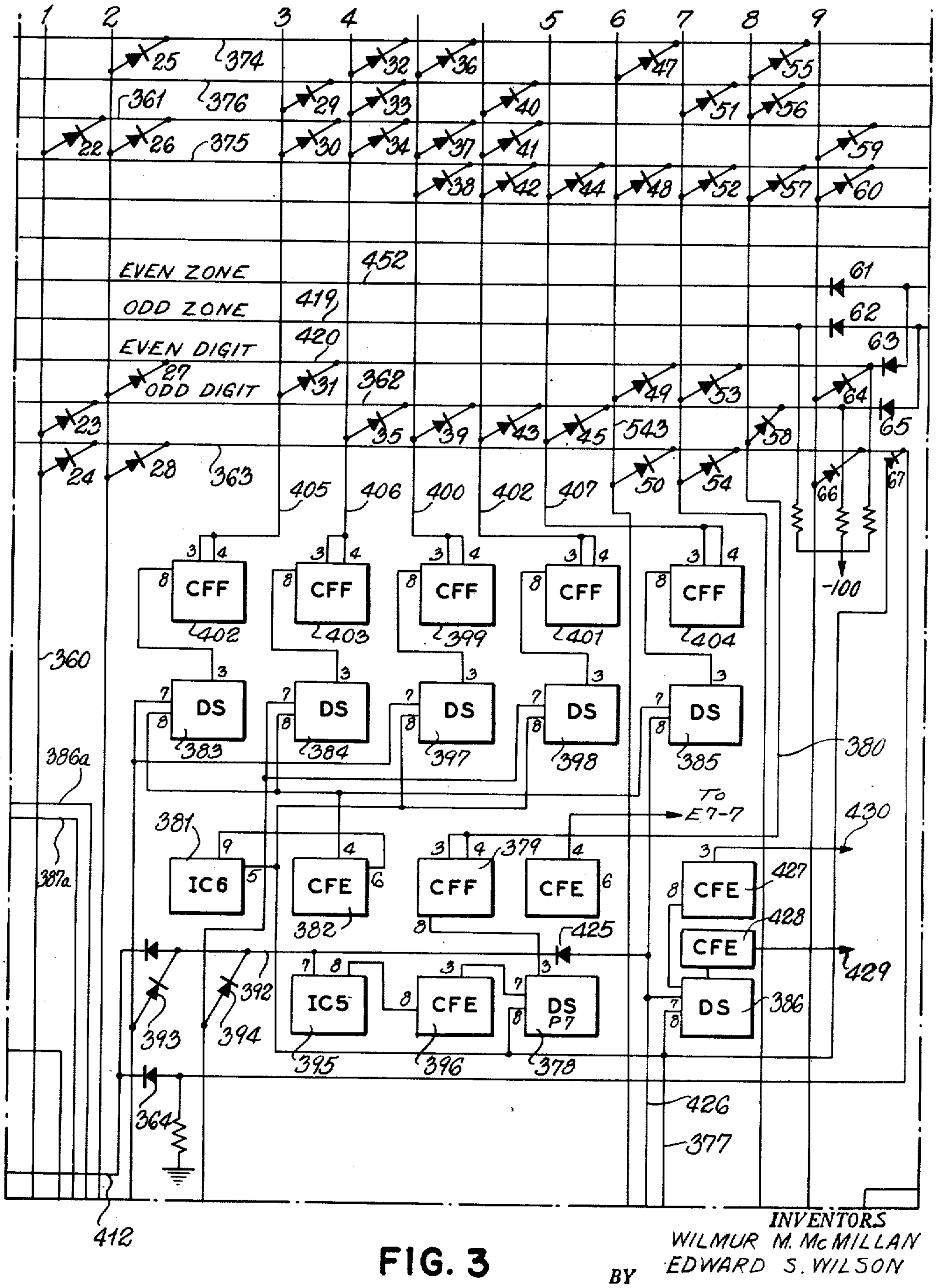
Figure 4:
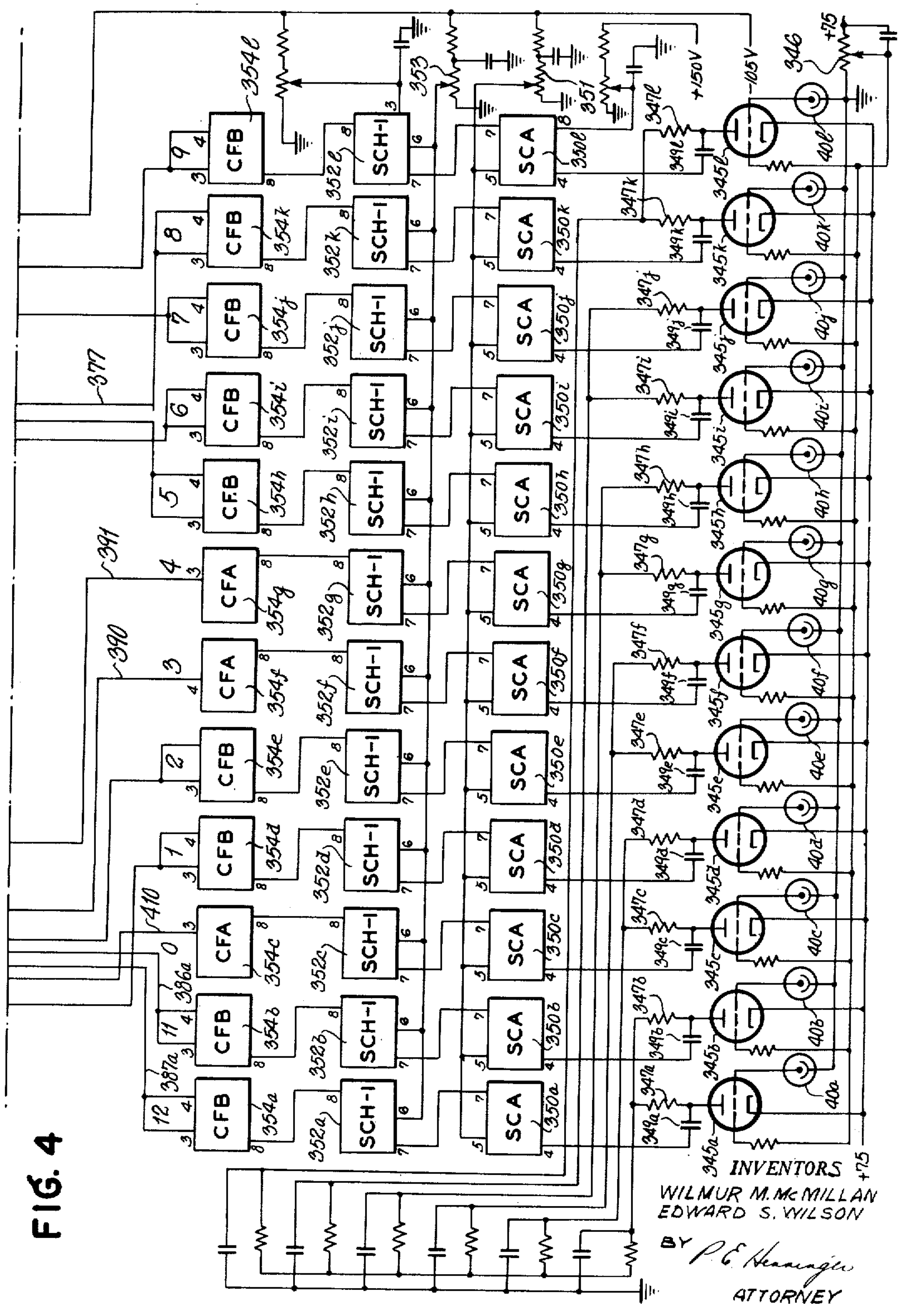

Referring now to Figs. 2 through 4, and particularly to Fig. 4, the twelve intelligence sensing photocells 40a through 40l are directly coupled to the grids of the amplifier triodes 345a through 345l with their cathodes grounded. The grids of the triodes 345a through 345l and hence the plates of the photocells 40a through 40l are commonly connected to a suitable adjustable source of positive D. C. potential through the potentiometer 346. The cathodes of the triodes 345a through 345l are connected in common to a suitable source of +75 volts D. C. potential. This arrangement permits the grounding of the photocell cathodes directly to the frame of the machine and thus simplifies the mounting problems and keeps the tube capacities to a minimum.

The plates of the tubes 345a through 345l are individually connected through the plate resistors 347a through 347l, respectively, to R–C decoupling units, generally designated 348, to decouple the amplifiers from the power supply and to prevent oscillation and feed-back in the circuit.

The plates of the triodes 345a through 345l are directly coupled through the coupling condensers 349a through 349l, respectively, to the input pins 4 of the SCA amplifiers 350a through 350l. Bias voltage for the SCA amplifiers 350a through 350l is applied through the pins 5 thereof and the potentiometer 351. The output of the SCA amplifiers 350a through 350l is applied to the input pins 7 of the respective SCH–1 triggers 352a through 352l respectively. Bias voltage for the SCH–1 triggers is obtained from the potentiometer 353. The output of the SCH–1 triggers 352a through 352l is applied to the input pins 8 of the respective CFA and CFB cathode followers 354a through 354l.

In the operation of the above components, the passage of a punched hole in a card over any one of the photocells 40a through 40l, as for example 40f, results in the production of a negative pulse applied to the grid of the amplifier 345f. This negative pulse is amplified and inverted therein and the resulting positive pulse output is applied to the input pin 4 of the SCA amplifier 350f. The SCA amplifier 350f is a two-stage amplifier and the amplified output pulse therefrom appearing at the output pin 7 thereof is positive in character. This positive output pulse is applied to the input pin 7 of the SCH–1 trigger 352f and is utilized to trip said unit. The triggering of the SCH–1 trigger results in the production of a shaped positive output pulse on the output pins 8 thereof. This shaped positive pulse is then applied to the CFA cathode follower 354f through the input pin 8. The positive pulse output of the CFA cathode follower 354f appears on the line 3 and is used to drive the translation matrix.

In the above described manner, positive pulses corresponding to the sensed intelligence on the cards are produced on the lines leading to the code translation matrix.

*Code translation components.*—As described in an earlier portion of this specification, the translation from the card code to the excess-three code is shown on Fig. 8. As illustrated, this is a modification of the normal card code. In the normal card code there are nine digital rows (1–9) and three zone rows (0, 11, 12), thus providing 27 two-punch permutations available for use. Actually since the alphabet contains only 26 letters, the combination 0–1 is omitted. In the normal card code system also, eleven special characters are obtained from the combination of 8–3 or 8–4 with any of the zone designations.

In this instance, in addition to the normal card code, there are provided "plus" and "minus" fields marks to designate the fields on the magnetic tape, together with a "record mark" to signify the end of the message. It should be noted at this point that the zero and 81st timing pulses described above generated so-called "field marks" on the tape and that the 82nd timing pulse generated a so-called "record mark." However, these were specifically related to the leading and trailing edges of the card or the extreme columns thereof. It will be readily recognized that it is both desirable and necessary to provide for record and field marks in the intermediate and sensed portions of the cards.

In the excess-three tape code there are provided four mechanical positions or channels which are conveniently designated as "1," "2," "4" and "8," together with two zone channels (A and B), and a third zone channel (C) for redundancy check purposes. Generally, the sensed digit part of the card code is directly translated into the digital components of the excess-three code, and the sensed zone portions of the card code are translated into the zone portions of the tape code, with certain exceptions. In the interests of brevity and clarity, the operation of the code translation matrix will be best explained by tracing the passage therethrough of certain digit characters, taking for example a single digit character and then proceeding on to more complicated tracing paths.

*The single digits 1, 2, 6, 7, 8 and 9.*—If, for example, a "1" is sensed on the card, reference to Fig. 8 shows that it is necessary to produce a bit in the "4" channel on the tape. The sensing of a "1" on the card results in the production of a positive shaped pulse on the dual output pins 3 and 4 of the CFB cathode follower 354d, in accordance with the above description of the card sensing and shaping unit. This positive pulse is transmitted to the diode code translation matrix along line 360 and appears on the "4" line 361 thereof, going to the input pin 6 of the S–9A gate 26c after passage by the matrix diode 22. The application of this positive pulse to the S–9A gate 26c, simultaneously with the application of a timing pulse corresponding to the columns sensed, results in the production of a negative pulse on the output pin 4 thereof. This negative pulse is inverted in the IC–FJ inverter cathode follower 126c and the positive output thereof is transmitted to the writing circuit for the "4" channel of the tape for the production of the desired bit thereon.

This positive pulse also appears on the Odd Digit line 362 after passage through the matrix diode 23. The pulse on the Odd Digit line 362 will be used in the redundancy check circuit which will be described at a later point in this specification. The positive pulse corresponding to a sensed designation "1" appearing on the line 360 also appears on line 363 after passage through the matrix diode 24. The pulse on line 363 is passed through the diode 364 and is applied to the input pin 3 of the IC–6 inverter-amplifier 365.

This positive pulse on the input pin 3 of the IC–6 inverter-amplifier 365 is amplified and inverted therein and the resulting negative output pulse appearing at the output pin 6 thereof is applied to the input pin 8 of the CFE cathode follower 367. The negative pulse output of the CFE cathode follower 367 is applied to the input pin 8 of the DS diode switch 368. The DS diode switch 368 is of such character that it requires the application of simultaneous input pulses to the input pins 7 and 8 for actuation thereof. Consequently, the application of the above pulse to the input pin 8 without the simultaneous application of a pulse to the pin 7 thereof results in a blocking action.

The negative pulse output of the IC–6 amplifier-inverter 365 is further inverted in the IH inverter 365A and the application of the positive pulse output thereof is applied to the input pin 6 of the CFE cathode follower 366 and results in the production of a positive output pulse on the common output pins 3 and 4 thereof. This positive output pulse is then applied to the input pins 7 of the DS diode switch 369, and also after passage through the rectifier 370, to the input pin 4 of the IC–5 amplifier-inverter 371. The DS diode switch 369 serves to block further passage of the pulse applied thereto. The positive pulse applied to the IC–5 amplifier-inverter 371 is amplified and inverted therein and the negative pulse output thereof, after passage through the CFE cathode follower 372, is applied to the input pin 8 of the DS diode switch 373 and is blocked thereby.

The pulses corresponding to the digits "2," "6," "7" and "9" receive generally similar treatment in the code translation matrix and the paths of said pulses can readily be traced on the drawing: The pulse for "2" appearing on the "4" and "1" lines 361 and 374 respectively; that for the "6" appearing on the "8" and "1" lines 375 and 361; that for the "7" appearing on the "8" and "2" lines 375 and 376; and that for "9" appearing on the "8" and "4" lines 375 and 361, respectively.

In a similar manner single punched designations of the zone rows "11" and "12" on a card will be fed onto the "B" line 386 and the "B" and "A" lines 386 and 387, respectively, of the matrix directly through the lines **386*a* and 387*a***.

A sensed digit in the 8 row can either pass through the unit as a single digit or in combination with others. If the 8 digital position is singly sensed, the positive pulse from the CFB cathode follower **354*k* will appear on the line 377. This pulse will pass through the DS diode switch 378 and through the CFF cathode follower 379 and will go up the line 380 and after passage through the matrix diodes 55, 56 and 57, it will appear on the "8," "2" and "1" output lines 375, 376 and 374** of the diode matrix.

This positive 8 pulse on the line 277 will also be inverted in the IC–6 inverter 381 and the negative pulse output therefrom after passage through the CFE cathode follower 382 is applied to the input pins 8 of the DS diode switches 383 and 384 and to the input pin 7 of the DS diode switch 385. These pulses serve to block said units.

This positive 8 pulse on line 377 will also be applied through the matrix diode 67 and the diode 364 to the IC–6 inverter 365 as was described in the above example and with the same result and also to the Odd Digit line 362 through matrix diode 58. The application of this pulse to the input pin 8 of the DS diode switch 386 has no effect since the input pin 7 thereof connected to CFB cathode follower **354*h*** has no switching pulse thereon.

*Complex digit translations.*—In addition to the single digit translation as described above, it will be remembered that the sensed digital combination of 8–3 and 8–4 are also used. In such instance it is, of course, necessary to block the path utilized for the sensing of a single 8 and to open separate paths through the translation matrix for the sensed combinations 8–3 and 8–4.

If an 8–3 or 8–4 combination is sensed, the positive pulse resulting from sensing of the 8 designation will appear as described above on line 377 and will be applied to the input pin 8 of the DS diode switch 378. The sensing of either the 3 or the 4 designation will result in the production of a positive pulse appearing at the output side of the cathode followers **354*f* and 354*g* on lines 390 and 391. These pulses will be transferred onto line 392 through the diodes 393 and 394 and will be applied to the input pin 7 of the IC–5 inverter 395. These pulses will be inverted therein and the negative pulse output therefrom will pass through the CFE cathode follower 396 and be applied to the input pins 7 of the DS diode switch 378. The application of this negative pulse serves to block that tube and to prevent the positive pulse from the sensed 8 designation previously appearing at pin 8 of the DS diode switch 378** from passing therethrough and entering into the code translation matrix.

At the same time the signal from the sensed 8 designation appears in the form of a positive pulse on the input pins 8 of the DS diode switches 397 and 398, respectively, which unblocks said units. If, for example, an 8–3 combination had been sensed, the positive pulse from the 3 position appears on pin 7 of the blocked DS diode switch 373 and on the pin 7 of the unblocked DS diode switch 397. The simultaneous application of pulses to the pins 7 and 8 of the DS diode switch 297 results in the passage of a positive pulse therethrough which, after passage through the CFF cathode follower 399, is fed into the diode matrix along the 8–3 line 400. After passage through the matrix diodes 36—39, inclusive, this pulse appears on the "1," "4," "8" and Odd Digit lines 374, 361, 375 and 362, respectively, of the matrix.

In a similar manner when an 8–4 combination is sensed, the positve pulse from the 4 position appears on the pin 7 of the blocked DS diode switch 384 and on the pin 7 of the unblocked DS diode switch 398. The simultaneous application of pulses to the pins 7 and 8 of the DS diode switch 398 results in the passage of a positive pulse therethrough, which after passage through the CFF cathode follower 401, is fed along the 8–4 line 402 into the code translation matrix. After passage through the matrix diodes 40–43 inclusive, this pulse appears on the "2," "4," "8" and Odd Digit lines 376, 361, 375 and 362 respectively of the matrix.

In conjunction with the above, it should be noted that if an 8 is not sensed, DS diode switches 383, 384 and 385 are unblocked and the DS diode switches 397, 398 are blocked. In such case, the single sensing of a 3, 4 or 5 position will result in the passage of a positive pulse through said units and their associated CFF cathode followers 402, 403 and 404, respectively, and into the translation matrix on lines 405, 406 and 407, respectively.

*Zero zone or zero digit determination.*—Another problem accommodated in the system is the determination of whether a zero sensed designation on the card is a zero zone or a zero digit. If the zero position on the card is sensed, a positive pulse output appears on the output pin 3 of the CFA cathode follower **354*c*. This positive pulse is applied through the line 410 to the input pins 7 and 8 of the DS diode switches 268 and 269 respectively and also through a diode 411 to the input pin 4 of the IC–5 inverter circuit 371. If at the same time any digit 1 through 9 is sensed, a positive pulse appears on line 412 and is applied to input pin 3 of the IC–6 inverter 265. This positive pulse is inverted therein and the negative pulse output thereof is passed through the CFE cathode follower 367 and applied to the input pin 8 of the DS diode switch 368. The application of this pulse blocks the DS diode switch 368. Thus it is apparent that if the zero is sensed in combination with any digit 1 through 9, the zero digit line 413 connected to the output side of the CFF cathode follower 414 is blocked and no pulse can be transmitted therealong through the DS diode switch 368 and the CFF cathode follower 414**.

The negative pulse output of the IC–6 inverter 365 is also applied to the input pin 5 of the IH inverter **365*a* and appears as a positive pulse output therefrom at the output plug 3. This positive pulse passes through the CFE cathode follower 366 and appears as a positive pulse output therefrom at the output pin 3. This positive pulse passes through the CFE cathode follower 366 and appears as a positive pulse at the output pin 4 thereof. This positive pulse is then applied to the input pin 7 of the DS diode switch 369 in coincidence with the above described positive pulse obtained from the zero sensed position. The simultaneous application of both pulses actuates the DS diode switch 369 and permits the passage of a positive pulse up the zero zone line 415 through the CFF cathode follower 416, the DS diode switch 417 and CFE cathode follower 418 and into the translation matrix. After passage through the matrix diodes 12 and 13, this pulse appears on the "A" and Odd Zone lines 387 and 419**, respectively.

If on the other hand the zero zone is sensed alone, i. e. without a digit 1 to 9, the lack of a digital pulse on line 410 will result in the DS diode switch 368 remaining unblocked and the sensed zero pulse will be fed into the translation matrix along line 413 through the CFF cathode follower 414. After passage through the matrix diodes 19, 20 and 21, this pulse appears on the "1," "2" and Even Digit lines 374, 376 and 420, respectively.

*Record and field marks.*—Also included in the translation components is provision for special characters in addition to the normal card code. The special characters of importance are the so-called "record" and "field" marks. These marks are obtained by combinations of the digital combination 8–5 and a zone bit and require special treatment in the blocking of certain digits or certain bits in the excess-three code in order to set up the proper combinations . In order to translate field marks or record marks, it is therefore necessary to generate an 8–5 line and 0–8–5 line.

In the sensing of an 8–5 digital combination, it is of course necessary to block off the individual 8 and 5 lines 380 and 307, respectively, to the translation matrix. In sensing the 8–5 combination, the positive pulse appearing from the sensed 8 designation is applied to the input pins 8 of the DS diode switches 378 and 386, respectively, as described above. The 8 pulse is also inverted in the IC–6 inverter 381 and after passage through the CFE cathode follower 382 is utilized to block the DS diode switch 385 and thus prevent the passage of any 5 pulse therethrough into the translation matrix. Similarly the 8 line 380 is blocked by the application of the 5 pulse through the diode 425, the IC–5 inverter 375 and the CFE cathode follower 396 to the input pin 7 of the DS diode switch 378.

The sensed 8 pulse is also applied through line 377 to the input pin 8 of the DS diode switch 386. The sensed 5 pulse is applied through line 426 to the input pin 7 of said DS diode switch 386. Connected to the output of the DS diode switch 386 are two CFE cathode followers 427 and 428. The CFE cathode follower 428 is used to transmit a blocking pulse when the 8–5 combination is not applied to the DS diode switch 386. The output line 429 therefrom may be termed the "No. 8–5" line. The CFE cathode follower 427 is utilized to transmit a pulse when the 8–5 combination is applied to the DS diode switch 386, and the output line 430 thereof may be termed the "8–5" line.

When the combinational 8–5 pulses are applied to the DS diode switch 386, the necessary 8–5 signal appears on the output line 430 of the CFE cathode follower 427. This pulse is applied to the input pins 7 of the DS diode switches 431, 432 and 433 (Fig. 2).

A "minus field mark" is an 11–8–5 combination and the necessary 11 pulse is transmitted along line 386 and is applied to the input pin 8 of the DS diode switch 431. The simultaneous application of these pulses trips the switch and results in the passage of a positive pulse through CFF cathode follower 434 and onto the line 435 leading to the translation matrix. After passage through the matrix diodes 1 and 2, this pulse appears on the 1 and 2 lines 374 and 376, respectively.

A "record mark" is a 0–8–5 combination and the necessary 0 pulse is transmitted by line 410, the DS diode switch 369 and the CFF cathode follower 416 to the input pin 8 of the DS diode switch 433. The simultaneous application of these pulses trips the switch and results in the passage of a positive pulse through the CFF cathode follower 436 and on to the line 437 leading to the translation matrix. After passage through the matrix diode 6, this pulse appears on the "B" line 386.

A positive "field mark" is just an 8–5 and when sensed alone passes through the unblocked DS diode switch 432 and CFF cathode follower 438 onto the line 439 leading to the matrix. The DS diode switch 432 is unlocked by a Blank Zone pulse being applied to the input pin 8 thereof. The Blank Zone pulse is also fed to the matrix on line 440 after passage through the CFE cathode follower 441 and IC–5 inverter 442 for redundancy check purposes. The Blank Zone line 440 will normally ride a positive potential unless the IC–5 inverter receives a pulse through the diodes 443—445 responsive to the sensing of a zone hole on the card.

The Blank Digit line 446 will normally ride at a positive potential unless a positive pulse indicative of a sensed digit 1–9 appears on line 410, is inverted in the IC–5 inverter 371 and the negative pulse output thereof after passage through the CFE cathode follower 372 causes a drop in potential.

*11 Zone Blank Digit and 11 Zone Zero Digit*

The illustrated system also includes provision for translating the sensed intelligence for ultimate tape recordation of "hyphen" and "ampersand."

The 11 Zone Blank Digit line 450 is used to drive a portion of the code translation matrix for production of the necessary pulses for recordation of a "hyphen." As reference to Fig. 8 will show, the coding for a "hyphen" requires the generation of a pulse on the "B," "A" and "2" lines 386, 387 and 376 respectively of the matrix. Sensing of an 11 Zone punch on the card alone results in the direct production of a positive pulse on the output pins 3, 4 of the CFB cathode follower **354*b*. This pulse appears directly on the 11 Zone line and on the "B" line 386 of the matrix after passage through matrix diode 11. The output pulse of the CFB cathode follower 354*b* is also applied to the input pin 7 of the DS diode switch 373. As no digit is simultaneously sensed therewith, the DS diode switch 373 is in an unblocked condition and positive pulse appears on the output pin 4 of the CFE cathode follower 452 and on the 11 Zone Blank Digit line 450. This pulse after passage through the matrix diodes 14 and 15 appears on the "2" and the "A" lines respectively. As no digit is being sensed the Blank Digit line 446 is riding at a positive potential and supplies a redundancy check signal via matrix diode 18**.

The 11 Zone Zero Digit line 453 is used to drive a portion of the code translation matrix for production of the necessary pulse for recordation of the special "ampersand" symbol. As reference to Fig. 8 will show, recordation of the "ampersand" requires pulsing of the "A," "B," "2" and "1" lines 387, 386, 376 and 361 respectively, as well as the production of a redundancy bit in the "C" tape channel. Sensing of an 11 and 0 zero punch on the card results in the production of a positive pulse on the output pins of the CFB and CFA cathode followers **354*b* and 354*c* respectively. The output of the CFB cathode follower 354*b* pulses the "B" line 386 of the matrix through the 11 Zone line and the matrix diode 11. This pulse is also applied to the input pins 7 of the DS diode switches 451 and 454. The output of the CFA cathode follower 354*c* is applied to the input pin 7 of the DS diode switch 368. As this DS diode switch 368 is in an unblocked condition due to the lack of a digital pulse on line 363, the application of the pulse to pin 7 thereof will result in the appearance of a pulse on the 0 Digit line after passage through the CFF cathode follower 455. The pulse on the 0 digit line will appear on the "1" and "2" lines 361 and 376 respectively of the matrix after passage through matrix diodes 19 and 20 respectively. A redundancy pulse is also supplied through matrix diode 21. The output of the CFF cathode follower 455 is also applied to the input pin 8 of the DS diode switch 454 and permits the application of the 11 Zone pulse on pin 7 thereof to trip the circuit and, results, after passage through the CFE cathode follower 456, in a positive pulse on the 11 Zone Zero Digit line 453. This pulse appears on the "A" line 387 of the matrix after passage through the matrix diode 16 and in addition thereto supplies a redundancy check pulse via matrix diode 17**.

*Component circuit elements*

As was previously followed with respect to the circuit elements of the timing control component, the nature of the circuits schematically illustrated in block form in Figs. 2 through 4, referred to above, will now be individually described.

*SCA amplifier.*—The SCA amplifier is preferably a pluggable unit comprising a two-stage amplifier as illustrated in Fig. 27. The tube employed may be a type 12AX7.

As illustrated in the drawing, the input pulse is adapted to be applied through the input pin 4 to the grid of the first stage tube 470 through a coupling condenser 471. The tube 470 is normally cut "off" by the bias supplied through a voltage divider network which includes the resistor 472 connected to the pin 5 which in turn is adapted to be connected to a potentiometer to supply a controllable negative D. C. potential and the resistor 473 connected to a +150 volt D. C. potential through the pin 3. Actually, the resistor 473 and the pin 3 form the plate load resistor for a preceding stage and the actual bias voltage is much less than the indicated +150 volts. The cathodes of the first tube 470 and the second tube 474 are commonly connected to the pin 6 which in turn is grounded. The grid of the first stage 470 is also by-passed to ground through a condenser 475 which serves as a high frequency noise by-pass. The plate of the tube 470 is connected through a plate load resistor 476 to a 150 volt D. C. supply through the output pin 9 and it is by-passed to ground through a high frequency by-pass condenser 477. The plate of the first stage 470 is coupled to the grid of the second stage 474 by the condenser 478. The second stage 474 is normally in a conducting condition, the necessary bias voltage, therefore, being supplied through the biasing resistor 479 connected to the pin 8 which in turn is connected to a positive source of variable D. C. potential, preferably a potentiometer. The plate of the second stage 474 is also connected to the pin 9 through a plate load resistor 480.

In operation of the illustrated circuit, the first stage 470 is normally in a cut-off condition and second stage 474 is normally conducting. Application of the positive pulse to the input pin 4 results in conduction of the first tube 470 and the production of an amplified negative pulse on the plate thereof. This negative pulse is transmitted to the grid of the second stage 474 through the condenser 478 and serves to cut the tube "off." The cessation of current flow therein results in the production of an amplified positive voltage pulse on the output pin 7.

*SCA trigger.*—The SCA trigger (Fig. 27) is identical with the above described SCH–R trigger (Fig. 18), the only difference between the two units being that SCH–1 trigger is not provided with the output plug 5 for the provision of a negative output pulse. The tube employed may be a type 12AX7.

*IH, IC5 and IC6 inverters.*—The IH, IC5 and IC6 inverters are preferably pluggable units comprising dual inverter circuits, and are illustrated in Figs. 28, 29 and 30, respectively. As these circuits are almost identical except for the pin identification and the values of the circuit elements, only the IH circuit will be described in detail.

As illustrated in Fig. 28, the IH inverter circuit is a dual unit both halves of which are independent. The tube may be a type 12AV7. For the purpose of convenience, we will only describe one of the two illustrated circuits. A negative input pulse is adapted to be applied through the pin 7 to the grid of the tube 483 through the resistor 484 and suppressor resistor 485. The resistor 484 is suitably by-passed by a condenser 486. Grid bias is supplied through a biasing resistor 487 connected through the pin 6 to a negative 250 volt D. C. supply. The plate of the tube 483 is connected to a +150 volt D. C. plate supply potential through the pin 9 and a plate load resistor 488. The output pulse is obtained from the pin 8 connected to the plate of the tube.

In operation the tube 483 is normally conducting. Application of a negative pulse to the grid of sufficient amplitude to cut the tube "off" results in pulse inversion, and the production of an amplified positive pulse at the output pin 8.

The IC5 (Fig. 29) inverter is basically similar to the IH unit except that the values of the circuit elements render the tube normally cut-off and make the unit responsive to positive input pulses.

The IC6 inverter (Fig. 30) is also basically similar to the IH unit except that the input pin thereof is adapted to be connected to the plate of an adjacent unit and the determination of whether the tube in the circuit will be normally conducting or will be cut-off will depend upon the actual potential on said plate.

*DS diode switch.*—The DS diode switch is preferably a pluggable unit comprising a switching circuit responsive to the simultaneous application of dual triggering pulses, and it is adapted to provide either a negative or a positive pulse output. The circuit which may employ a type 12AV7 tube is illustrated in Fig. 31.

Referring to the drawing, the first stage tube 489 comprises a triode whose grid is connected to the dual input pins 7 and 8 through a suppressor resistor 490, a coupling resistor 491 and the diodes 492 and 493, respectively. The coupling resistor 491 is suitably by-passed by a condenser 494. The input pins 7 and 8 are adapted to be connected to the cathodes of the preceding stages and hence to ground through the cathode resistors. The cut-off bias for the grid of the first stage 489 is supplied through a voltage divider including the resistor 495 connected to a negative 250 volt D. C. source through the pin 6 and the resistors 496 and 491 connected to a +75 volt D. C. supply through the pin 9.

As the diode rectifier tubes 492 and 493 are normally conducting, the voltage appearing at point 497 is a small positive value. This small positive value, however, is more than overcome by the negative potential on the grid supplied through the resistor 495, and the tube 489 is normally cut "off." Application of a single positive pulse to either the pins 7 or 8 is not sufficient to render the tube 489 conducting. Application of simultaneous positive pulses to the input pins 7 and 8 serves to cut "off" the diodes 492 and 493 and the cessation of current flow therethrough raises the potential on the grid of the tube 489. This increase in potential renders the tube conducting. When the tube starts to conduct, it produces a negative pulse on the plate thereof, the plate being connected through the plate load resistor 498 to a +150 volt D. C. supply through pin 4. This negative pulse appearing on the plate of the first stage 489 can be taken off through output pin 5 if desired.

The plate of the first stage 489 is directly coupled to the second stage 499 through the coupling resistor 500 bypassed by condenser 501, and suppressor resistor 502. The second stage 499 is normally conducting, the necessary bias therefor being supplied by a voltage divider network including the resistor 500 and the plate load resistor 498 connected to the plate supply potential through the pin 4 and the resistor 504 connected to pin 6. The plate of the second stage 499 is connected through the plate load resistor 503 to the plate supply pin 4.

When the first tube 489 starts to conduct the negative pulse as above described appears on the plate thereof and is applied to the grid of the second stage 499. This normally conducting stage is then cut "off" and the cessation of current flow through its plate load resistor 503 results in the appearance of a positive output pulse on the output pin 3.

Thus through the operation of the above described circuit, it is seen that it serves as a switch in that it requires dual simultaneous positive pulses to be applied to the input pins 7 and 8 in order to get a negative output pulse at the pin 5 or a positive output pulse at the output pin 3. In addition thereto, as the first stage 489 is normally non-conducting, it also serves as a buffer and prevents signal passage therethrough. When it is tripped by the application of simultaneous pulses, it provides either a negative or a positive pulse signal output.

*CFA cathode follower.*—The CFA cathode follower is preferably a pluggable unit comprising dual cathode follower circuits in the form of a single pluggable unit, and is illustrated in Fig. 32. The two circuits included therein are identical and for the purpose of convenience only one of such circuits will be described. A type 5687 tube may be employed.

Referring to the drawing, a positive input pulse is adapted to be applied through the pin 6 to the grid of the tube 505 through a coupling condenser 506 and a parasitic suppressor resistor 507. The cathode of the tube 505 is connected to ground through the cathode resistors 508 and 509. The plate is directly connected to a +150 volt D. C. plate supply through the pin 5. Bias for the grid is obtained through a voltage divider network which includes the resistor 510 to be connected to a negative 250 volt D. C. supply through the pin 7 and the resistor 511 connected to the plate supply pin 5. The positive output pulse is obtained from the pin 4 directly connected to the cathode of the tube 505.

*CFB cathode follower.*—The CFB cathode follower is preferably a pluggable unit comprising a dual cathode follower having a single input and a dual output as illustrated in Fig. 33.

As illustrated, a positive input pulse is adapted to be applied through the pin 8, coupling condenser 512 and parasitic suppressor resistor 513 to the grid of the tube 514. The input pulse is also supplied to the grid of the second tube 515 through the parasitic suppressor resistor 516. The cathodes of each tube are connected to ground through the resistors 517, 518 and 519, 520, respectively. The plates are both directly connected to a positive 150 volt D. C. supply through the pins 9 and 5, respectively. Grid bias for both tubes is obtained through a voltage divider network which includes the resistor 521 connected to a negative 250 volt D. C. supply through the pin 7 and the resistor 522 which is connected to the plate supply pin 9.

In operation of this circuit, the application of a positive input pulse at the input pin 8 results in the production of dual positive output pulses appearing at the output pins 4 and 3, respectively.

*CFF cathode follower.*—The CFF cathode follower is preferably a pluggable unit comprising a single input, dual output cathode follower circuit and is illustrated in Fig. 34.

Referring to the drawing, the input pulse is adapted to be applied to the grid of the first tube 523 through the input pin 8, the coupling resistor 524, by-passed by the capacitor 525, and the parasitic suppressor resistor 526. This input pulse is also simultaneously applied to the grid of the second stage 527 through the suppressor resistor 528. The cathodes of both stages are coupled to ground through resistors 531, 532 and 533, 534, respectively. The plates of both tubes are connected to a positive 150 volt plate supply through the pins 9 and 5 respectively. Bias for both tubes is obtained by the biasing resistor 530 connected to a negative 250 volt D. C. supply through the pin 7.

*CFE cathode follower.*—The CFE cathode follower is preferably a pluggable unit comprising a dual cathode follower unit in the form of a single pluggable unit and is illustrated in Fig. 35.

As illustrated, both halves of the pluggable unit, which may be type 5687 tubes, are symmetric and independent and each half is basically similar to one stage of the previously described CFF cathode follower (Fig. 34).

*Redundancy check bits*

As described at an earlier portion of this specification, the magnetic tape used is provided with seven channels upon which the sensed intelligence may be impressed. In the system as described herein, the sensed intelligence is always impressed on one or more of the channels of the seven channel tape and there must always be an odd number of bits on any one column on the tape. Consequently, it is necessary to use the 7th column on the tape to either add or not add a bit to make the total number of bits in any given column thereon an odd number in every case. This serves as a check on the system in that whenever an even number of bits appears in later sensing of the tape, there is provided a signal to indicate the existence of an error.

Referring now to Figs. 3 and 5, the four lines in the translation matrix which are involved are the ones designated Even Zone, Odd Zone, Even Digit and Odd Digit 542, 419, 420 and 362, respectively. The Even Zone, Odd Zone lines 542, 419 are concerned with the number of bits appearing in any sensed zone portion. In a similar manner, the Even Digit, Odd Digit lines are concerned with the number of bits representative of the sensed digits rather than the actual mechanical values of the digits in question. For example, if a digit 6 is sensed on the card, the 8 and 1 lines 375 and 374 of the matrix are pulsed and this comprises two bits. Consequently there is also a matrix diode jumper 49 from the 6 line 543 onto the Even Digit line 420. In contradistinction thereto, if the number 4 is sensed, three bits of information will feed out of the diode matrix on the 1, 2 and 4 lines thereof, 374, 376 and 361, respectively. This is an odd number of bits; consequently a pulse is also applied to the Odd Digit line 362 by the matrix diode jumper 35. In a similar manner, if two zone bits are supplied, there will be a pulse jumped on to the Even Zone line 542. If one or three zone bits are generated, there will be a pulse jumped onto the Odd Zone line 419. In this connection the Blank Zone and Blank Digit are also called even.

Examination of the possible permutations shows that the combination of an Even Zone and an Even Digit will result in an algebraic total that is even and consequently it is then desired to add a bit to the 7th track on the magnetic tape. Similarly, when an Odd Zone and an Odd Digit are algebraically added, the algebraic sum will be an even one and will require the addition of an additional bit in the 7th tape track. In contradistinction therewith, a combination of Even Zone and Odd Digit, and Odd Zone and Even Digit will provide the necessary odd number of bits on the magnetic tape.

The pulses appearing on the Even Zone and Even Digit lines 542 and 420 are applied to the matrix diodes 61 and 63 in the common input line connected to the input pin 4 of the TM–CFS cathode follower switch 453. The pulses appearing on the Odd Zone and Odd Digit lines 419 and 362 are applied to the matrix diodes 62 and 64 in the common input line connected to the input pin 7 of the TM–CFS cathode follower switch 543. Referring now to Fig. 36, the TM–CFS cathode follower switch is there illustrated. There are provided two triodes 544, 545 having their plates connected to ground through the common cathode resistors 546 and 457. The plates are commonly connected to a +150 volt plate supply through the pin 9. The grid of the tube 544 is connected to the input pin 4 through a suppressor resistor 548 and the grid of the other tube 545 is connected to the input pin 7 through the suppressor resistor 549. Bias for the grids is supplied through the resistors 550 and 551 connected to a 75 volt positive D. C. source through the pin 6. The connections of the matrix diodes 61, 62, 63 and 65, to the input pin 4 is illustrated in dotted lines.

In operation, both the tubes 544 and 545 are normally conducting at a steady low D. C. level. If a positive pulse appears on both the Even Zone and Even Digit matrix lines 542 and 420, flow of current through the matrix diodes 61 and 63 is halted. This stopping of current flow through the resistor 550 results in an increase in potential on the grid of tube 544 and in the production of a positive pulse on the output pin 3. A positive pulse on only one of the lines 542 or 420 will not result in the desired output pulse. In a similar manner the appearance of a positive pulse on both the Odd Digit and Odd Zone lines 362 and 419 will result in the desired pulse on the output pin 3.

Any output pulse appearing on pin 3 will trip the S–9A gate 26g if the required timing pulse is simultaneously applied and the output thereof, after passage through the IC–FJ inverter cathode follower 126g is transmitted to actuate the 7th channel writing head.

*Tape write unit*

The pulse appearing on the lines of the translation matrix and applied to the input plugs 6 of the S–9A gates 26a through 26g are about 200 microseconds in duration and are of a rather indiscriminate shape. Coincidentally therewith, the timing pulses which are of about four microseconds duration are applied to the input pins 4 of said S–9A gates. Simultaneous application of both pulses results in the generation of a sharp short output pulse which is used to trigger the IC–FJ inverter cathode followers 126a through 126g. In actual operation, the input pulse to the IC–FJ inverter cathode followers is negative but, after passage through said units, the pulse appears as a sharp output pulse of short duration, the cathode followers also serving to power the lines to the tape writing heads.

The writing head circuits are in reality trigger circuits. In operation, the tape is being continually magnetized as it passes the respective writing heads. Actuation of the trigger circuit contained in the writing circuit provides a change in the direction of magnetization, such change being representative of the sensed intelligence. The writing head circuit is illustrated in Fig. 11.

In operation of the circuit, the positive pulse output of the IC–FJ inverter cathode follower is applied through the condenser 560 and resistor 561 to the grid of the triode 562. The plate of the tube 562 is connected to a +150 volt plate supply through the resistors 567 and 568 and the cathode thereof is grounded. In passage through the tube 562 the pulse is amplified and inverted and appears as a negative pulse on the plate thereof. This negative pulse is then transmitted through the coupling condenser 563 and diodes 564 and 565 and is simultaneously applied to both the grids of the trigger tube 566. The trigger tube 566 is in reality a "flip-flop" multivibrator with one side thereof being normally conductive. As the trigger tube 566 is practically a standard multivibrator similar to those previously described in detail heretofore, brevity will, therefore, be served by not describing the same in detail. Application of this negative pulse to the grid of the conducting portion of the trigger tube 566 results in a cutting "off" of that portion and a rapid initiation of conduction in the other portion. This produces a sharp positive pulse on the plate of the cut-off portion and a sharp negative pulse on the other plate.

These pulses are applied to the grids of the dual amplifier 569. The actual writing head 570 is connected in the plate circuits of the amplifier 569 and as each half of the amplifier 569 is rendered conducted, a writing current is caused to flow directionally through the writing head 570 and the reversing of the direction of that current flow provides the necessary reversal of the direction of magnetization in the tape channels. As such, the necessary information is recorded on the magnetic tape as a change in direction of magnetization.

The principles of the invention have been described and illustrated in a single operative system for the purpose of teaching those skilled in the art how the invention may be performed. Changes in the components, units and assemblies will appeal to those skilled in the art, and it is contemplated that such changes may be employed, but yet fall within the spirit and scope of the claims that are to follow.

What is claimed is:

1. A synchronizing system for data processing apparatus adapted to transcribe to a different record medium the data arranged in a plurality of columns on a tabulating card comprising: a tabulating card reading station having a fixed guide surface for supporting tabulating cards in movement thereover, sensing means in said reading station for sensing successive columns of card recorded intelligence as tabulating cards are passed therethrough, storage means connected to said sensing means adapted to receive intelligence read from a card column by said sensing means, record transcribing circuits connected to said storage means adapted to transcribe intelligence in said storage means upon another record medium, tabulating card position controlled means in said reading station for producing an electrical control signal upon each columnar advance of a tabulating card therein, normally closed gate circuits in the connections between said transcribing circuits and said storage means, and a connection between said gates circuits and said tabulating card position controlled means whereby said gates circuits are opened by said control signal and data in said storage means is impressed on said record transcribing circuits.

2. The invention defined in claim 1 in which said sensing means comprises a plurality of photo-electric cells adapted to be energized by light passing through holes punched in a tabulating card column.

3. The invention of claim 1 in which said tabulating card position controlled means is responsive to variation in light caused by the passage of a tabulating card through said reading station.

4. The invention of claim 1 in which said tabulating card position controlled means comprises a plurality of light transmitting slots in said guide surface in communication with photo-multiplying circuits sensitive to a diminution of light as a tabulating card in said reading station covers a successively greater number of said slots in its passage over said guide surface.

5. The invention of claim 1 in which said tabulating card position controlled means comprises a plurality of light transmitting slots equal in number at least to the number of columns of a tabulating card to be sensed in said sensing station, and in which substantially equal groups of slots communicate with common photo-multiplying circuits.

6. The invention of claim 1 in which said sensing means is arranged transversely of said guide surface and said tabulating card position controlled means includes a plurality of light transmitting slots in said guide surface arranged in a line perpendicular to said sensing means.

7. The invention of claim 1 in which said sensing means includes a plurality of photoelectric cells arranged in communication with a row of slots extending transversely of said guide surface, and said tabulating card position controlled means includes a plurality of light transmitting slots in said guide surface arranged in a line perpendicular to said row of slots.

8. A synchronizing pulse generating system for electronic apparatus adapted to process data arranged in a plurality of columns on a tabulating card comprising: a tabulating card reading station having a fixed guide surface for supporting tabulating cards in movement thereover, a plurality of light transmitting slots in said guide surface adapted to be progressively covered by a tabulating card in its passage over said guide surface, light sensitive means in communication with said slots adapted to emit a current proportional to the intensity of light passing through said slots, and a differentiating circuit connected to the output of said light sensitive means for generating a synchronizing pulse upon each variation in the current output of said light sensitive means.

9. The invention of claim 8 in which said slots are at least equal in number to the number of columns of a tabulating card to be processed.

10. The invention of claim 8 in which equal groups of said slots are in communication with a common light sensitive means, and in which the output of each light sensitive means is connected to a differentiating circuit.

References Cited in the file of this patent

UNITED STATES PATENTS 2,702,380 Brustman et al. ---------- Feb. 15, 1955

OTHER REFERENCES

Article: "Punched-Card to Magnetic-Tape Converter," by E. Blumenthal and F. Lopez in "Review of Input and Output Equipment," page 8 of the joint A. I. E. E.–I. R. E.–A. C. M. Computer Conference, March 1953. (Copy in Div. 42).